US006757521B1

(12) United States Patent
Ying

(10) Patent No.: US 6,757,521 B1
(45) Date of Patent: Jun. 29, 2004

(54) METHOD AND SYSTEM FOR LOCATING AND ASSISTING PORTABLE DEVICES PERFORMING REMOTE DIAGNOSTIC ANALYSIS OF A CONTROL NETWORK

(75) Inventor: Jeffrey Ying, Glendora, CA (US)

(73) Assignee: I/O Controls Corporation, Azusa, CA (US)

( * ) Notice: Subject to any disclaimer, the term of this patent is extended or adjusted under 35 U.S.C. 154(b) by 397 days.

(21) Appl. No.: 09/592,021

(22) Filed: Jun. 12, 2000

(51) Int. Cl.[7] .............................................. H04B 17/00
(52) U.S. Cl. ....................... 455/67.11; 455/457; 701/29
(58) Field of Search ................................ 455/456, 457, 455/440, 67.11, 424; 701/29, 32, 34, 35

(56) References Cited

U.S. PATENT DOCUMENTS

| | | | |
|---|---|---|---|
| 4,315,251 A | 2/1982 | Robinson et al. | 340/310 A |
| 5,173,855 A | 12/1992 | Nielsen et al. | 364/420 |
| 5,309,351 A | 5/1994 | McCain et al. | 364/132 |
| 5,311,185 A * | 5/1994 | Hochstein et al. | 342/44 |
| 5,394,158 A * | 2/1995 | Chia | 342/457 |
| 5,613,205 A * | 3/1997 | Dufour | 455/440 |
| 5,745,049 A | 4/1998 | Akiyama et al. | 340/870.17 |
| 5,758,300 A | 5/1998 | Abe | 701/33 |
| 5,815,071 A | 9/1998 | Doyle | 340/439 |
| 5,845,272 A | 12/1998 | Morjaria et al. | 706/50 |
| 5,884,202 A * | 3/1999 | Arjomand | 701/29 |
| 5,917,405 A | 6/1999 | Joao | 340/426 |
| 5,922,037 A | 7/1999 | Potts | 701/29 |
| 5,963,882 A | 10/1999 | Viertl et al. | 702/39 |
| 5,987,394 A | 11/1999 | Takakura et al. | 702/123 |
| 6,006,147 A | 12/1999 | Hall et al. | 701/29 |
| 6,029,508 A | 2/2000 | Schoenbeck et al. | 73/116 |
| 6,127,947 A | 10/2000 | Uchida et al. | 340/999 |
| 6,169,943 B1 | 1/2001 | Simon et al. | 701/29 |
| 6,177,867 B1 | 1/2001 | Simon et al. | 340/468 |
| 6,181,994 B1 | 1/2001 | Colson et al. | 701/33 |

(List continued on next page.)

FOREIGN PATENT DOCUMENTS

| | | | |
|---|---|---|---|
| WO | WO 99/45517 | 9/1999 | G08C/15/12 |

OTHER PUBLICATIONS

"Phone Home; GE Transportation Systems' Remote Monitoring & Diagnostics Technology Helps Increase Train & Mining 'Up–Time,'" Yahoo! Finance, PR Newwire, Jul. 17, 2000.

Printout from "www.snapon.com" website, Snap–On Technologies, Inc., (undated), 8 pages.

Primary Examiner—Marsha D. Banks-Harold
Assistant Examiner—Nghi H. Ly
(74) Attorney, Agent, or Firm—Irell & Manella LLP

(57) ABSTRACT

A system for monitoring, controlling, and locating portable computerized devices performing remote diagnostic analysis of control networks. The portable, wireless equipment includes computerized display device connected to a wireless intermediary device for allowing a wireless connection to be made to a control network. The computerized diagnostic device may be embodied as a personal digital assistant (PDA) having a graphical screen display, on which may be displayed the network nodes and connections of the control network presented against a backdrop of a transit vehicle or other facility shown in three-dimensional, rotatable images. The wireless equipment may allow the operator to force individual system components to output states, and provide for real time monitoring. The portable, wireless equipment is programmed with information pertaining to the connections and locations of the components in the control network, thereby simplifying diagnosis or testing by the operator. The portable, wireless equipment may be operated within a network of wireless communication cells, whereby transmitted messages between the portable, wireless equipment and the control networks may be monitored and the position of each device determined. Graphical images of the control networks may be displayed or rotated based upon the operator's relative position and orientation within respect to the control network.

27 Claims, 20 Drawing Sheets

U.S. PATENT DOCUMENTS

| | | |
|---|---|---|
| 6,236,917 B1 | 5/2001 | Liebl et al. .................... 701/29 |
| 6,253,122 B1 | 6/2001 | Razavi et al. ................... 701/1 |
| 6,253,129 B1 | 6/2001 | Jenkins et al. ................. 701/29 |
| 6,263,268 B1 | 7/2001 | Nathanson .................... 701/29 |
| 6,301,531 B1 | 10/2001 | Pierro et al. .................. 701/29 |
| 6,317,029 B1 | 11/2001 | Fleeter .................... 340/10.32 |
| 6,317,668 B1 | 11/2001 | Thibault ...................... 701/35 |
| 6,321,142 B1 | 11/2001 | Shutty ........................... 701/1 |
| 6,324,659 B1 | 11/2001 | Pierro ......................... 714/48 |
| 6,330,499 B1 | 12/2001 | Chou et al. .................... 701/33 |
| 6,336,065 B1 | 1/2002 | Gibson et al. ................. 701/29 |
| 6,338,152 B1 | 1/2002 | Fera et al. ..................... 714/48 |
| 6,421,009 B2 * | 7/2002 | Suprunov .................... 342/465 |
| 2001/0012976 A1 | 8/2001 | Menig et al. .................. 701/1 |
| 2002/0004694 A1 | 1/2002 | Mcleon et al ................. 701/29 |

* cited by examiner

METHOD AND SYSTEM FOR LOCATING AND ASSISTING PORTABLE DEVICES PERFORMING REMOTE DIAGNOSTIC ANALYSIS OF A CONTROL NETWORK

RELATED APPLICATION INFORMATION

This application is related to PCT application Ser. No. PCT/US00/09644 entitled "Method and System for Performing Remote Diagnostic Analysis of Control Network," filed on Apr. 10, 2000, hereby incorporated by reference as if set forth fully herein.

BACKGROUND OF THE INVENTION

1) Field of the Invention

The field of the present invention relates to electronic diagnostic and maintenance tools for control networks.

2) Background

Electronic control systems are commonly used in a number of manufacturing, transportation, and other applications, and are particularly useful to control machinery, sensors, electronics, and other system components. Manufacturing or vehicular systems, for example, may be outfitted with a variety of sensors and electrical and/or mechanical parts that may need to be activated, deactivated, monitored, enabled, disabled, adjusted or otherwise controlled when needed to perform their predefined functions. Control of the various system components is generally accomplished by providing suitable electronic signals to various actuators, relays, switches, or other control points within the system. Control systems often require that processes be carried out in a prescribed order, or with a level of responsiveness, that precludes sole reliance on manual control. Also, such systems may employ sensors or other components that require continuous or periodic monitoring or control, and therefore lend themselves to automated or semi-automated control.

A variety of different network architectures for controlling electronic systems have been developed or proposed. Examples of various control networks include programmable logic controller (PLC) based multiplexed control systems in which a single central processing unit (CPU) is used to control a number of input/output (I/O) modules or network nodes; network-controlled multiplexed control systems in which a network of interconnected CPUs are used to control a number of I/O modules at the various network nodes; and hierarchical, master-slave multi-bus control systems, wherein CPU-driven network nodes are connected together at each bus level in a loop configuration.

In most control networks, it is necessary to be able to diagnose operational problems that may occur within the system. Operational problems may result from wiring faults, component failures (either in the control network or in the components being controlled by the control network), or logic flaws, among other reasons. Also, it may be necessary to test the operation of the controls system from time to time, such as when components are added or removed, or when functionality of the control system is added or changed.

Traditionally, diagnosis and testing of a control network is carried out by manual activation of switches, relays or actuators, and observing the results on the input/output devices of the control system. Conventional meters (e.g., an Ohm-meter) may be used to determine if electrical signals from the control network are reaching the intended destination(s). Due to the different types of operational problems that can occur (e.g., wiring fault vs. component failure), and the myriad of possible places in which a fault or failure could occur, locating the source of an operational problem can be an extremely slow and laborious process. With the increasing complexity of control systems and the steadily growing number of components used in such systems, diagnosis and testing become even more critical and, in many respects, more difficult.

To conduct a complete manual test or diagnosis of a control system can be very time consuming and tedious. The test personnel generally need to read complicated circuit blueprints and locate each relay, switch, actuator or other component that needs to be tested. Often, multiple relays, switches or actuators will need to be activated, switched or otherwise positioned to test a particular system component. In such a case, the test personnel needs to locate and set each such relay, switch and/or actuator to its proper position, which can be a lengthy process. In many control systems, simply locating the appropriate switches, relays or actuators can be difficult, especially if the control system is complex and includes many components. Also, particularly in the case of on-board control systems used in vehicles (such as buses or rail cars), the switches, relays or actuators can be located in inconvenient places and thus hard to find or set to reach manually.

Diagnosis and testing of a control network is sometimes carried out by connecting a test computer (usually a laptop or other portable computerized device) to a diagnostic and maintenance port of the control network. The test computer is generally programmed to receive various types of information from the control network to allow an operator to monitor the functioning of the control system. The test computer may also be used to download new programming instructions to the control network via the diagnostic and maintenance port.

An illustration of a test computer set-up for monitoring a control network is illustrated in FIG. 1. As shown in FIG. 1, a vehicle 101 (shown in phantom for convenience of illustration) has a control network 110 (shown in solid, dark lines) with various I/O modules dispersed throughout the vehicle 101. A test computer 103 connects by a cord 106 to a module 112 containing the diagnostic and maintenance port. The test computer 103 is thereby able to monitor the functioning of the control network 110.

FIGS. 2, 3 and 4 are diagrams of test computer set-ups for different control networks as known in the art. FIG. 2 illustrates a hierarchical, master-slave control network 120, having a master bus controller (MBC) 125 connected to a common bus 138, which connects various network nodes in a loop configuration. The network nodes may include, for example, high-speed cell net controller (HCNC) modules 128 and digital input/output (DIO) modules 127, or other types of modules, all of which generally operate in a slave mode with respect to the common bus 138. The control network 120 may also include one or more secondary buses (not shown). Further information about certain types of hierarchical, master-slave control networks may be found in U.S. Pat. Nos. 5,907,486 and 6,061,600 and Japanese Patent documents 10-326259 and 10-333930, all of which are assigned to the assignee of the present invention and hereby incorporated by reference as if set forth fully herein. The control network 120 may be physically connected to a test computer 123 from time to time through an RS-485 compatible diagnostic and maintenance port 129, for the purpose of testing and monitoring the functionality of the control network 120 as generally described above.

FIG. 3 is a diagram of a PLC-based multiplexed control system 140, in which a single main central processing unit (CPU) 146 is used to monitor and control a number of network nodes 150. Each network node 150 typically includes a programmable logic controller (PLC), which, in turn, monitors various input signals or conditions (such as temperature, current, speed, pressure and the like) and generates output signals to various output devices (such as actuators, relays or switches) through input/output (I/O) modules 152, thus providing localized control at various network node sites. The main control network CPU 146 communicates with the PLCs of each of the network nodes 150 over a main system bus 147, and provides top-level command and control. The main control network CPU 146 may be physically connected to a test computer 149 from time to time through an RS-232 compatible diagnostic and maintenance port 148, for the purpose of testing and monitoring the functionality of the control network 140 as previously described.

FIG. 4 is a diagram of a network-controlled multiplexed control system 160 in which a network of interconnected CPUs 170 are used to control a number of I/O modules 172. A main CPU 166 is connected to other dispersed CPUs 170 over a control area network (CAN) bus or device net 167. The CAN bus or device net 167 may be physically connected to a test computer 169 from time to time through a CAN bus or device net gateway 175, which connects to the CAN bus or device net through a CAN bus or device net test port 168. Testing or monitoring of the functionality of the control network 160 may thus be carried out, as previously described.

While the use of a computer to monitor the functioning of a control system has some advantages, present systems have limitations and drawbacks. For example, the test computer generally must be kept close to the diagnostic and maintenance port, due to the cord 106 (as shown in FIG. 1) connecting the test computer to the diagnostic and maintenance port. This arrangement physically limits where the test personnel can view relevant information. Thus, test personnel working at the back of the vehicle 101, for example, could not view the information being shown on the test computer 103. Therefore, the test personnel would need to walk back and forth between the test computer 103 and the pertinent locations of the vehicle 101 in order to carry out an ongoing test or diagnostic procedure. Further, the test personnel often need to refer to complicated circuit blueprints to interpret the information on the test computer 103 and to locate the various locations of interest within the control network 110 of the vehicle 101. Such blueprints are usually in paper form and are cumbersome to deal with. Cross-referencing between the circuit blueprints and the information on the test computer 103 takes extra time and effort on the part of the test personnel, and may be the source of human error in conducting a test or system diagnosis. Further, the types of testing, monitoring and diagnosis that can be conducted using a test computer 103, at least as conventionally practiced, are limited.

Some systems for wireless diagnosis or monitoring have been proposed in contexts such as diagnostic analysis of an automobile or similar vehicle. Examples of such wireless systems may be found in U.S. Pat. Nos. 5,758,300 and 5,884,202. Conventional wireless diagnostic and monitoring systems typically involve a portable wireless unit that is specifically configured for a single type of application. Therefore, such portable wireless units are useless for monitoring systems other than the type for which they are specifically configured. Creating a custom portable wireless unit for each type of control network can be expensive and time-consuming. Also, despite being wireless, the type of information and test functionality they provide is limited, and most, if not all, such wireless systems do not have the functionality to operate in the context of a sophisticated control network.

Additionally, conventional diagnostic systems provide little technical assistance to, or control over, maintenance personnel who service on-board control networks used in vehicles. Rather, a maintenance engineer generally relies upon whatever information he or she can carry, typically in the form of manuals, blueprints, guidebooks and the like. These types of materials, as noted, are cumbersome, and may require the maintenance shop to maintain a large library of technical publications if many different types of vehicles are to be serviced. It is often necessary for maintenance personnel to document their work; however, there is no convenient way for a company to ensure that the records of its employees regarding maintenance work performed is accurate. There is also no convenient way to oversee the work of maintenance personnel remotely, without having a supervisor on hand in the same vicinity as the employee.

Therefore, a need presently exists for a flexible, versatile and simple to use test and diagnosis tool suitable for either simple or complex control network systems. Further, a need exists for improving technical assistance to maintenance personnel, for reducing the need for keeping large libraries of printed technical publications, for ensuring the accuracy of documentation relating to maintenance work performed by such personnel, and for overseeing maintenance work performed on vehicles serviced by such personnel.

SUMMARY OF THE INVENTION

The invention provides in one aspect systems and methods for monitoring, diagnosing and/or testing a control network using portable, wireless diagnostic equipment, as well as systems and methods for monitoring, tracking and controlling portable, wireless diagnostic equipment.

In one embodiment as disclosed herein, portable electronic diagnostic equipment is programmed to allow for diagnosis and testing of a control network. The portable electronic diagnostic equipment may be carried by maintenance personnel in connection with, for example, diagnosing, testing, programming or re-programming an on-board control network on a vehicle. The maintenance area is preferably covered by a local wireless communication network, which may take any of a variety of forms. In one embodiment, a plurality of wireless ground stations are deployed throughout the maintenance area in a cellular arrangement, similar in some respects to a cellular telephone system. Each wireless ground station may communicate wirelessly with portable electronic diagnostic equipment carried around the area by maintenance personnel. The wireless ground stations may comprise independent base stations, each having its own transmitting and receiving equipment and antenna(s), or else may comprise a set of geographically dispersed antennas connected to a central station containing the transmitting and receiving electronics. Depending upon various communication metrics, such as received signal strength, the position of the portable electronic diagnostic equipment (and therefore, the maintenance person carrying the equipment) can be determined.

In certain embodiments, the local wireless communication network tracks the location of the portable electronic diagnostic equipment operating within a proximity of the network. The division of the maintenance area into a plurality of contiguous microcells facilitates tracking the location of the diagnostic equipment, and also helps ensure that a clear signal can be received by the diagnostic equipment regardless of which part of the maintenance area it is brought to. The local wireless cellular network is preferably connected to a local area computer network (e.g., a LAN), where operators may monitor the activity of maintenance personnel and may control communications with the portable electronic diagnostic equipment.

In certain embodiments, the portable electronic diagnostic equipment comprises a portable, wireless intermediary device connected to a diagnostic device which is programmed to allow for diagnosis and testing of a control network. The diagnostic device preferably is embodied as a personal digital assistant (PDA) preferably comprising, among other things, an on-board computer and a graphical screen display. The portable, wireless intermediary device includes a line interface (either serial or parallel) to the diagnostic device, and receives, formats and modulates the output of the diagnostic device for communication over a wireless channel to a wireless interface unit connected to the control network. The portable, wireless intermediary device thereby enables wireless communication between the diagnostic device and the control network, allowing testing, monitoring and/or diagnosis of the control network.

In certain embodiments, the portable, wireless equipment is programmed to test, monitor and/or diagnose a control network. The portable, wireless equipment preferably comprises a graphical screen display for displaying images to the operator useful for testing, monitoring and/or diagnosing the control network. The displayed images may include an illustration of all or part of the control network within the context of the facility (e.g., building, vehicle, plant, robot, machine or other facility), to facilitate the operator's testing, monitoring and/or diagnosis of the control network. The image of the facility may be presented on the graphical screen display in "phantom" to allow the operator to easily view the components of the control network being observed or tested.

In another embodiment, the portable, wireless equipment is programmed to allow the operator to force individual system components to a desired output state. By entering various inputs, the operator causes test commands to be conveyed wirelessly from the portable, wireless equipment to the control network, whereupon the test commands are relayed to the appropriate system component. If working properly, the system component changes state to the desired output state. The portable, wireless equipment is preferably programmed to receive feedback from the control network over the wireless connection, and to display the states of the relevant switches along the output path to the system component being tested or observed. The portable, wireless equipment is programmed with information pertaining to the connections and locations of the components in the control network, thereby simplifying diagnosis or testing by the operator, and reducing or eliminating the need for the operator to carry and interpret bulky, cumbersome manuals and circuit blueprints.

In another embodiment, the portable, wireless equipment includes an automated procedure for testing a line connection between a diagnostic device carried by an operator and a portable, wireless intermediary device which facilitates wireless communication to the control network. The portable, wireless equipment may also include an automated procedure for testing the wireless connection between the portable, wireless intermediary device and the control network.

When used in conjunction with the local wireless communication network, location tracking of the portable electronic diagnostic equipment permits the "phantom" images of the control network to be oriented relative to the position of the diagnostic device operator. Rotation of the phantom image display of the control network relative to the position of the operator may provide a clearer, less obstructed view of the control network being observed or tested, and thus facilitate the diagnostic or test procedures being carried out by the operator.

In another embodiment, the local wireless communication network allows monitoring and control of actions carried out by maintenance personal, by allowing monitoring and control of electronic activity of the portable electronic diagnostic equipment. This functionality allows ground station supervisors to observe and record actions by maintenance personnel, to provide immediate feedback to maintenance personnel, and override, if necessary, actions being taken by the maintenance personnel using the potable electronic diagnostic equipment. Among other things, such functionality enhances the overall security of the diagnostic and testing system.

Further embodiments, variations and enhancements are also described herein.

DETAILED DESCRIPTION OF PREFERRED EMBODIMENTS

Various systems and methods for monitoring, controlling, diagnosing and/or testing a control network using portable, wireless equipment will now be described in connection with preferred embodiments of the invention.

Figure 27:
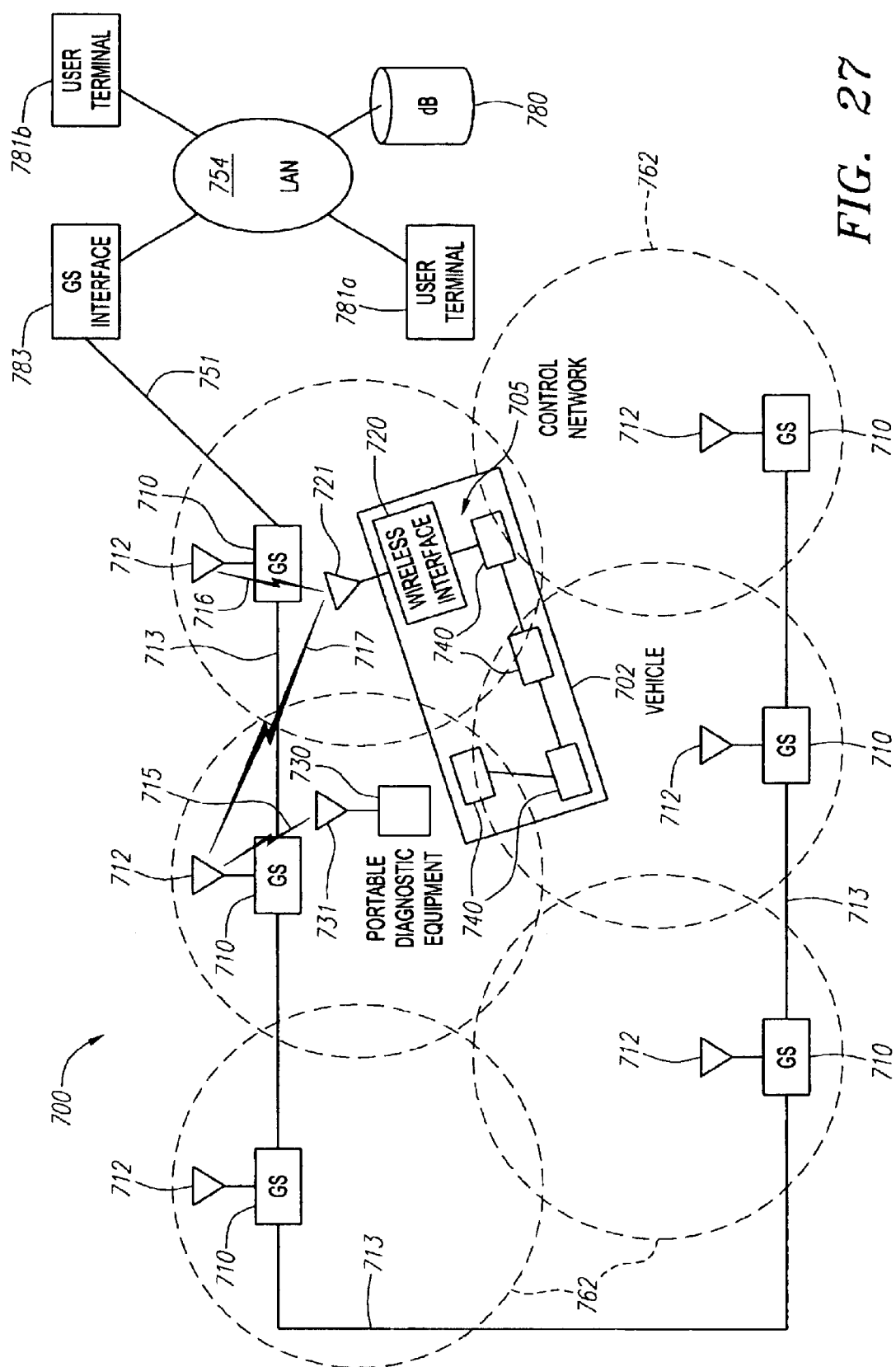
FIG. 27 is a block diagram of a local wireless communication network useful for monitoring, controlling and/or tracking the position of portable wireless equipment used to remotely diagnose, test and maintain control networks.

FIG. 27 is a block diagram of one embodiment of a wireless diagnostic and control system 700 useful for monitoring, controlling and/or tracking the position of portable wireless equipment used to remotely diagnose, test and maintain control networks. In accordance with a preferred embodiment as disclosed herein, a local area is generally organized into a plurality of separate regions or microcells 762, which collectively cover the entirety of the local region in which diagnosis and maintenance is to be carried out. A vehicle 702 may be brought into the vicinity of the microcells 762 for diagnosis or maintenance. The vehicle may be of any type, such as, for example, a bus, light rail car, airplane or ship. Accordingly, the wireless diagnostic and control system 700 may be associated with a garage, railyard, airplane hangar, shipyard, or other area in which vehicles are typically be brought for routine diagnosis or maintenance.

In a preferred embodiment, a plurality of ground stations 710, each having an antenna 712, are dispersed in the microcells 762 so as to provide wireless communication capability therein. The ground stations 710 may be connected by landlines 713 in any suitable arrangement (e.g., serial chain, loop, or hub-and-spoke arrangements, to name a few). The ground stations 710 provide wireless communication with portable electronic diagnostic equipment 730 within the region covered by the microcells 762. The ground stations 710 may be located anywhere within the microcells 762, depending in part upon the type of antennas 712 selected. For example, a ground station 710 may be located at the center of a microcell 762 if it uses an omnidirectional antenna 712, or towards the edge of a microcell 762 if a directional antenna 712 is used.

The portable electronic diagnostic equipment 730 is preferably of sufficiently small size that it may be conveniently carried around by an operator. As the operator travels from microcell to microcell 762, communication may be handed off from ground station to ground station 710. The details of the handoff depend primarily on the wireless communication protocol selected. Alternatively, each of the ground stations 710 may transmit simultaneously, in which case a synchronization signal may be provided to each of the ground stations 710 via the landlines connecting them. Where the ground stations 710 transmit simultaneously, fewer overall wireless channels will be available for communication. Where the number of portable electronic diagnostic devices 730 are not many, only a few wireless channels may be needed.

Each ground station 710 may have its own transmitting and receiving electronics locally therein, allowing it to communicate independently with any number of portable electronic diagnostic devices 730. Alternatively, each ground station 710 may essentially comprise an antenna 712 used as a "listening post" (and transmitting beacon), with all data being carried to and from a centralized location (e.g., ground station interface 783) for processing. Since the microcells 762 will ordinarily be relatively small (depending upon the size of the maintenance area), the power level need for transmission by the ground stations 710 or the portable electronic diagnostic equipment 730 will not be excessive. Since more than one operator carrying portable electronic diagnostic equipment 730, the communications between the various portable electronic diagnostic equipment 730 (which may be numerous) and the various control networks 705 (which may also be numerous) are preferably distinguishable.

In certain embodiments, the communication protocol used in the wireless diagnostic and control system 700 is a multiple access protocol—such as, for example, a frequency division multiple access (FDMA) protocol, a time division multiple access (TDMA) protocol, or a code division multiple access (CDMA) protocol, or some combination thereof. Similarly, transmissions to and from the different ground stations 710 may be distinguished by different frequencies, time slots and/or codes. The portable electronic diagnostic equipment 730 is preferably configured to communicate using any of the frequency bands or communication protocols utilized by any of the ground stations 710 within the maintenance area. A wide variety of wireless communication protocols and electronics are known in the art, and the wireless diagnosis and control system 700 may utilize most any such protocol or electronics. Thus, the invention is to be in no way limited by the particular wireless communication protocol or equipment selected.

The ground station interface 783 provides a gateway to a local area network 754. The local area network 754 may comprise, among other things, one or more user terminals 781 (e.g., user terminals 781a and 781b), along with a diagnostic and maintenance information database 780. As explained in more detail herein, supervisors or other personnel may be stationed at the user terminals 781, and may thereby monitor or control activity occurring within the region of the microcells 762, by communicating with the portable electronic diagnostic equipment 730. While monitoring, surveillance and control functionality is described herein with respect to a local area network 754, it is also possible that such functionality could be included in a less sophisticated or more elaborate system, for example, a single standalone workstation under control of a single supervisor, or a larger, more expansive area network.

The vehicle 702 is outfitted with an on-board control network 705, which preferably includes a wireless interface 720 and antenna 721 for communicating with the portable electronic diagnostic equipment 730 and/or the ground stations 710. The control network 705 may comprise, among other things, a plurality of network nodes 740 for controlling the operation and functionality of the vehicle 702. By way of illustration, the control network 705 may comprise any of the control network types shown in FIGS. 6, 7, 8 or 9, or any other type of control network.

The portable electronic diagnostic equipment 730 may be embodied in a variety of different manners. The portable wireless diagnostic equipment 730 preferably comprises appropriate electronics (e.g., transmitter, receiver, and processor) to enable wireless communication with the control network 705 located on-board the vehicle 702 and, more particularly, with the wireless interface 720 of the control network 705. The portable wireless diagnostic equipment 730 also preferably comprises appropriate electronics to enable wireless communication with the ground stations 710 of the wireless diagnostic and control system 700. In FIG. 27, a wireless communication link 715 between the portable electronic diagnostic equipment 730 and a ground station 710 is illustrated, as is a wireless communication link 717 between the portable electronic diagnostic equipment 730 and the wireless interface 720 of the control network 705. The control network 705 may also be provided with appropriate electronics to enable wireless communication with the ground stations 710 of the wireless diagnostic and control system 700, as illustrated by wireless communication link 716 in FIG. 27. Either the same or different frequency bands and communication protocols may be used for wireless communication links 715, 716 and 717; however, in a preferred embodiment, the same frequency bands and communication protocols are used for each of wireless communication links 715, 716 and 717, for reasons explained in more detail below.

The portable electronic diagnostic equipment 730 may be constructed as a single, integrated device having both diagnostic functionality as well as wireless communication capability with the control network 705 and/or the ground stations 710 of the wireless diagnostic and control system 700. In other embodiments, the portable electronic diagnostic equipment 730 may comprise different mechanical units, each having a subset of the overall functionality. By way of illustration, the portable electronic diagnostic equipment 730 may be embodied as the combination of a handheld, computerized diagnostic device (such as, e.g., the handheld, computerized diagnostic device or personal digital assistant 201 or 420 shown in FIGS. 6 and 12, respectively) and a wireless intermediary unit (such as, e.g., wireless intermediary unit 205, 300 or 430 shown in FIGS. 6, 10 and 12, respectively). However, the portable electronic diagnostic equipment 730 may also take many other forms. The portable electronic diagnostic equipment 730 preferably comprises, among other things, a graphical display for displaying diagnostic and maintenance information, a user interface (such as, e.g., a keypad, computer mouse, touchscreen, microphone/speaker with associated voice recognition hardware and/or software, or the like), and a data storage module (any sort of volatile or non-volatile memory) for storing information needed for performing diagnostic and maintenance functions.

Figure 13:
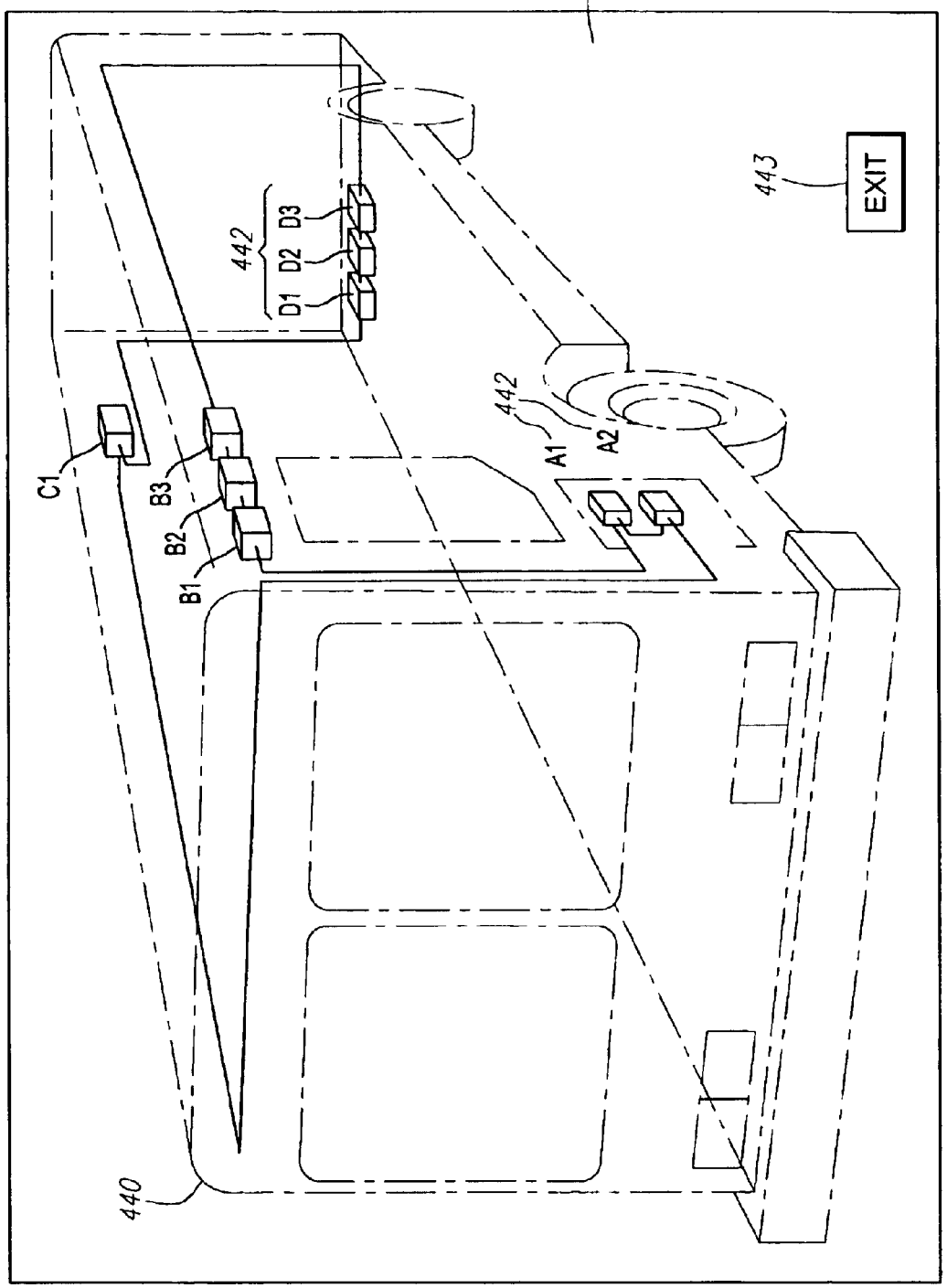
FIG. 13 is an example of a screen image depicting a vehicle outline in relation to control network nodes and other features.

Examples of operation of the wireless diagnostic and control system 700 will now be explained. A vehicle 702 may be transported into the maintenance area covered by microcells 762 for diagnosis or maintenance. As illustrated in FIG. 27, the vehicle 702 may straddle several microcells 762. If desired, more or fewer microcells 762 may be used, but having relatively small microcells 762 such that a vehicle 702 is covered by several microcells 762 can have certain advantages. In particular, with small microcells 762, the wireless diagnostic and control system 700 can track the location of the portable electronic diagnostic equipment 730 and thereby allow dynamic selection of the most useful type of diagnostic information to provide to the portable electronic diagnostic equipment 720 as it is carried around by an operator. In one embodiment, for example, based upon the relative position of the portable electronic diagnostic equipment 730, the operator is presented with the appropriate view of the control network components, on the graphical display of the portable electronic diagnostic equipment 730. An example of a view of a vehicle that may be presented to the operator is shown in FIG. 13. As the operator moves about the vehicle 702, the view presented on the graphical display may rotate along with the operator's position. To facilitate such functionality, information concerning the position of the vehicle 702 is provided to the wireless diagnostic and control system 700. This information may be obtained automatically, such as, for example, by monitoring the wireless interface 720 of the control network 705 when the vehicle 702 is brought into the maintenance area. Such information may also be obtained straight-forwardly by use of position sensors (on the walls, if any, and/or the ceiling or floor), or by manual input of such information. In some environments, it may be desirable to require that the vehicle 702 be positioned in a certain space or berth, and in a certain specific orientation, so as to facilitate the acquisition of the vehicle position information.

The position of the operator may be determined at least in part using the received signal strength, or other signal quality metrics, of the signal transmitted by the portable electronic diagnostic equipment 730. Near cell boundaries, comparisons of the signal quality metrics received at multiple ground stations 710 may be advantageously used to make more precise position estimates. Increasing or decreasing signal strengths may be used to indicate movement in position. While it may not be necessary, triangulation algorithms may also be used to locate the precise position of the operator, based on information obtained from or received by multiple ground stations 710. Any necessary processing may be carried out, for example, at the ground station interface 783, using any suitable electronics (e.g., a microprocessor with digital signal processing capability). Techniques for determining relative received signal strengths are well known in the art of wireless communications.

To provide assistance to the wireless diagnostic and control system 700 for the purposes of displaying graphical images oriented in relation to the operator's position with respect to the vehicle 702, the portable electronic diagnostic equipment 730 may be provided with an interface allowing the operator to enter information concerning the operator's view of the vehicle 702. For example, the operator may be provided with a selection of possible viewpoints (e.g., viewing towards front of vehicle, viewing towards back of vehicle, viewing towards left of vehicle, viewing towards right of vehicle, etc.), and may periodically select one such viewpoint (as the operator moves about the vehicle) using the interface means provided at the portable electronic diagnostic equipment 730. This information may be relayed to the grounds stations 710 and processed in connection with other position information. One of the user terminals 781, or some other hardware or software application in the local area network 754, may be designated to process the position information to determine each operator's location. Based on all the available information, the local area network 754 transmits, via the ground station interface 783, the position information back to the portable electronic diagnostic equipment 730.

In another embodiment, the ground stations 710 may each be configured to periodically transmit an identifiable control signal which may be used by the portable electronic diagnostic equipment 730 to determine its location among the various ground stations 710 using various signal quality metrics such as received signal strength. However, in such a case, the portable electronic diagnostic equipment 730 may need to be programmed with knowledge as to the geographical layout of the ground stations 710. In such an embodiment, the portable electronic diagnostic equipment 730 may also make use of any position information (e.g., viewpoint) entered by the operator.

The diagnostic and maintenance information for the particular vehicle 702 may, in some cases (particularly if there are many possible vehicles to be serviced), be stored elsewhere than in the portable electronic diagnostic equipment 730, due to possible memory constraints. Comprehensive diagnostic and maintenance information may be stored in the diagnostic and maintenance information database 780 of the local area network 754, and remotely accessed by the portable electronic diagnostic equipment 730 as needed. In one embodiment, for example, the operator may enter a vehicle identifier into the portable electronic diagnostic equipment 730, which then retrieves the appropriate diagnostic and maintenance information from the local area network 754 over wireless communication link 715.

The activity of operators using portable electronic diagnostic equipment 730 may be monitored remotely at the local area network 754 through wireless communication links 715 and/or 716. An advantage of using the same frequency bands and communication protocols for each of wireless communication links 715, 716 and 717 is that the data transmitted back and forth between the portable electronic diagnostic equipment 730 and the control network 705 over wireless communication link 717 can be monitored by ground stations 710, and relayed to the local area network 754. Each diagnostic step or test procedure carried out by the operator can therefore be observed and, if desired, recorded at the local area network 754. Each communication packet may contain an identifier of the portable electronic diagnostic equipment 730 (or equivalently, the operator) and/or the particular vehicle 702. From such information, diagnostic records for each vehicle serviced may be maintained and periodically updated at the local area network 754, providing a valuable source of information for the maintenance provider. Also, security is enhanced, because the activity of operators can be directly monitored by supervisors at user terminals 781 of the local area network 754.

In certain embodiments, supervisors may be provided with an ability to remotely override or shut down activity by particular maintenance personnel if deemed necessary. For example, if an operator has initiated in inappropriate test, the supervisor may issue a command at a user terminal 781 which is relayed either or both the portable electronic diagnostic equipment 730 and on-board control network 705, instructing that the test be ignored, and possibly locking out further diagnostic or test capabilities on a temporary basis. If desired, the graphical display of the portable electronic diagnostic equipment 730 may provide an informational message to the operator that such action has been taken.

Another use of the wireless diagnostic and control system 700 is that maintenance personnel can obtain, through the wireless connections, service advice from mechanics, electricians, engineers or other technical experts remotely located at a central location (i.e., the local area network 754).

Figure 28:
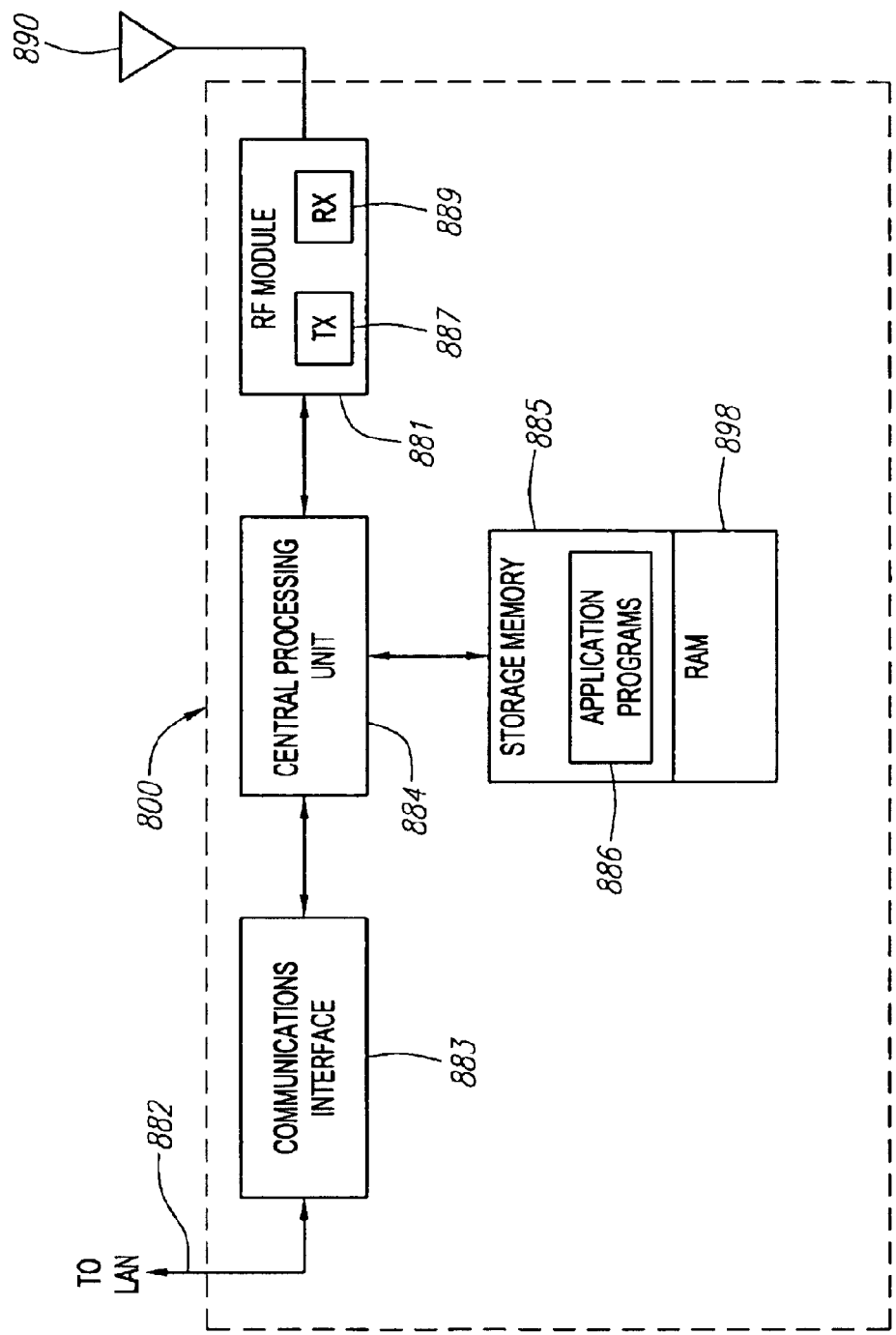
FIG. 28 is a block diagram of one embodiment of a ground station as may be deployed in a local wireless communication network.

FIG. 28 illustrates one possible embodiment of a ground station 800 as may be used to assist with monitoring, controlling, and/or locating portable electronic diagnostic equipment 730 within the maintenance area of the wireless diagnostic and control system 700. As illustrated in FIG. 28, a ground station 800 may comprise an RF module 881 having a transmitter 887 and a receiver 889, connected to an antenna 890. A processor 884 for controlling various operations and functions of the ground station 800 is connected to the RF module 881, and is also connected to a communications interface 883. The processor 884 is further connected to a memory 885, which stores data and one or more application programs 886 in the form of programming code for execution by the processor 884. The memory 885 preferably comprises a random-access memory (RAM) portion 898, and may also include a read-only portion where in the application programs 886 can be stored (although the application programs 886 may alternatively be downloaded from the local area network 754 and stored in the local RAM portion 898 of the memory 885).

The communications interface 883 provides a wired (or possibly wireless) connection to the local area network 754. The communication interface 883 may utilize any conventional data transport technique, and may comprise, for example, a serial interface (such as an RS-232 or Universal Serial Bus (USB) interface), a parallel interface, a fiber optic interface, or any other suitable interface, using any conventional protocol for transporting data to and from the various ground stations to the ground station interface 783. By way of illustration only, the ground station interface 783 may comprise a ground communications processor which polls each of the ground stations 710 to determine whether the ground station 710 has data to transport to the local area network 754. Alternatively, the ground station interface 783 may communicate with the ground stations 710 in a prescribed sequential order, or may communicate with the ground stations 710 in parallel (over physically separate channels), and may use any conventional multiplexing techniques to ensure that data is smoothly transferred between the ground station interface 783 and each of the ground stations 710. The ground station interface 783 may also, as previously noted, comprise electronics for processing quality metrics associated with signals received at the ground stations 710, to determine the position of the portable electronic diagnostic device 730 within the maintenance area.

Returning to FIG. 27, in accordance with one embodiment as disclosed herein, when an operator first activates a portable electronic diagnostic equipment 730 or enters the maintenance area with the device activated, the portable electronic diagnostic equipment 730 may scan one or more set-up channels which are designated among the total channels collectively utilized by the ground stations 710. Each ground station 710 may be provided with its own unique set-up channel. The portable electronic diagnostic equipment 730 may select one of the set-up channels based upon various criteria (e.g., the strongest signal quality) and attempt to establish a bidirectional communication link with the ground station 710. Locking onto the strongest set-up channel usually results in selecting the nearest microcell 762. Once the bidirectional communication link between the portable electronic diagnostic equipment 730 and the ground station 710 is established, a request for service may be transmitted to the local area network 754 via the ground station 710. The local area network 754 may respond by, e.g., transmitting diagnostic or maintenance information retrieved from the diagnostic and maintenance information database 780 to the portable electronic diagnostic equipment 730.

When the portable electronic diagnostic equipment 730 is transported from one microcell 762 to another, a handoff of communication may occur whereby the bidirectional communication link is transferred from one ground station 710 to another. Such a handoff may entail the portable electronic diagnostic equipment 730 changing operative frequency band, time slot and/or code. Handoff may be controlled by the ground station interface 783, which essentially acts in this context as a central station or ground station controller. Preferably, no more than minimal interruption occurs to the communication link 715 between the portable electronic diagnostic equipment 730 and the ground station 710. Handoff may be initiated, in one embodiment, when the strength of the signal received from the portable electronic diagnostic equipment 730 falls below a certain level, thus indicating that the portable electronic diagnostic equipment 730 is at or near a boundary of a microcell 762.

Further details regarding the operation of the local wireless communication network illustrated in FIG. 27 are described later herein; however, first presented below are details concerning various preferred embodiments of portable electronic diagnostic equipment 730 and control networks 705, in order to allow fuller appreciation of the capabilities and functionality of the overall wireless diagnostic and control system 700.

Figure 1:
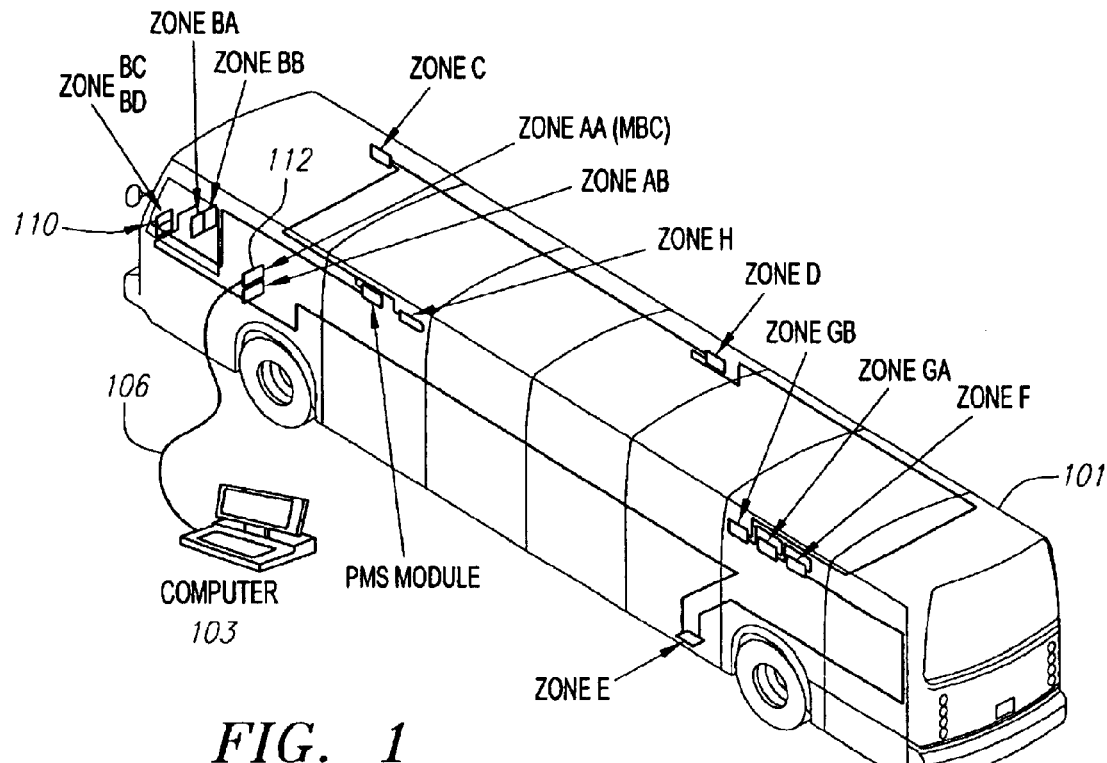
FIG. 1 is a diagram illustrating a control network diagnostic technique as known in the prior art.
Figure 5:
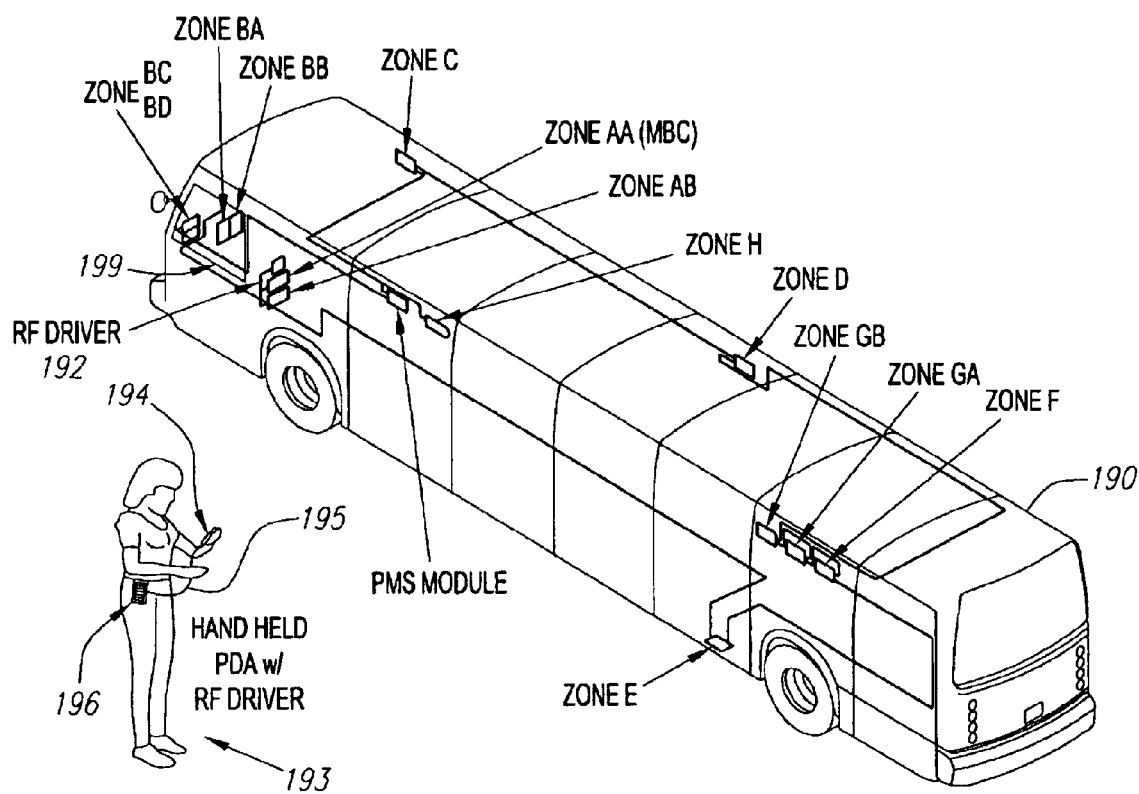
FIG. 5 is a diagram illustrating a control network diagnostic technique in accordance with a preferred embodiment as disclosed herein.
Figure 6:
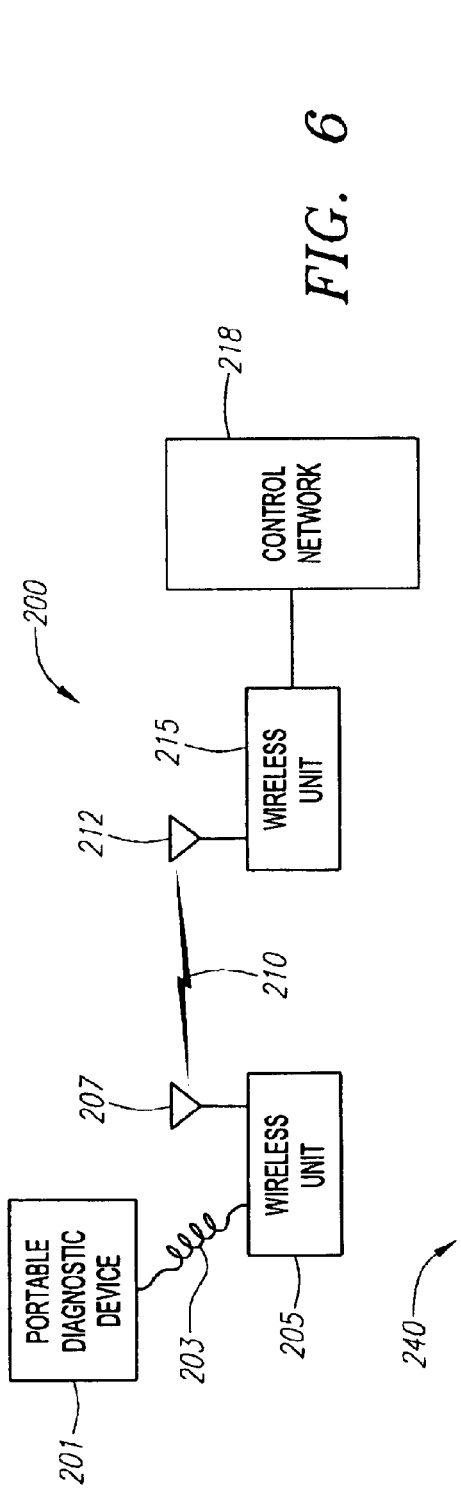
FIG. 6 is a top-level diagram of a remote diagnostic system in accordance with a preferred embodiment as disclosed herein.

FIG. 5 is a diagram illustrating concepts of control network diagnosis and/or testing in accordance with a preferred embodiment as disclosed herein, as exemplified by a control network system deployed in a mobile vehicle 190 (in this example, a bus). As illustrated in FIG. 6, the vehicle 190 (shown in phantom) has a control network 199 (shown in dark, solid lines within the vehicle 190) for controlling circuitry and system components located throughout the vehicle 190, much the same as the control network shown in FIG. 1. However, the control network 199 shown in FIG. 5 also includes a wireless diagnostic and maintenance linking device (e.g., an radio frequency (RF) driver) 192 for providing a wireless connection to portable wireless equipment utilized by an operator 193. The wireless equipment preferably includes a handheld, computerized diagnostic device 194, such as a personal digital assistant (PDA) or similar device which is programmed to provide testing and diagnostic functionality, and a wireless intermediary device 196. The computerized diagnostic device 194 connects to the wireless intermediary unit 196 by a connector cord 195 or other suitable means. The wireless intermediary unit 196 is configured to communicate with the wireless diagnostic and maintenance linking device 192, thereby allowing wireless communication between the computerized diagnostic device 194 and the control network 199. The operator 193 can thus, for example, perform at least all of the test and diagnosis operations that could be performed by connecting a test computer to the control network 199, but without being restricted as to mobility. The computerized diagnostic device 194 also preferably includes further functionality as described herein.

FIG. 6 is a top-level block diagram of a remote diagnostic system 200 in accordance with a preferred embodiment as disclosed herein. As illustrated in FIG. 6, the remote diagnostic system 200 comprises a portable, computerized diagnostic device 201 (such as a personal digital assistant (PDA)) which is connected to a wireless intermediary unit 205 for the purpose of allowing wireless communication with a control network 218. The wireless intermediary unit 205 is configured to communicate with a wireless diagnostic and maintenance linking device 215 which provides wireless access to the control network 218.

Figure 2:
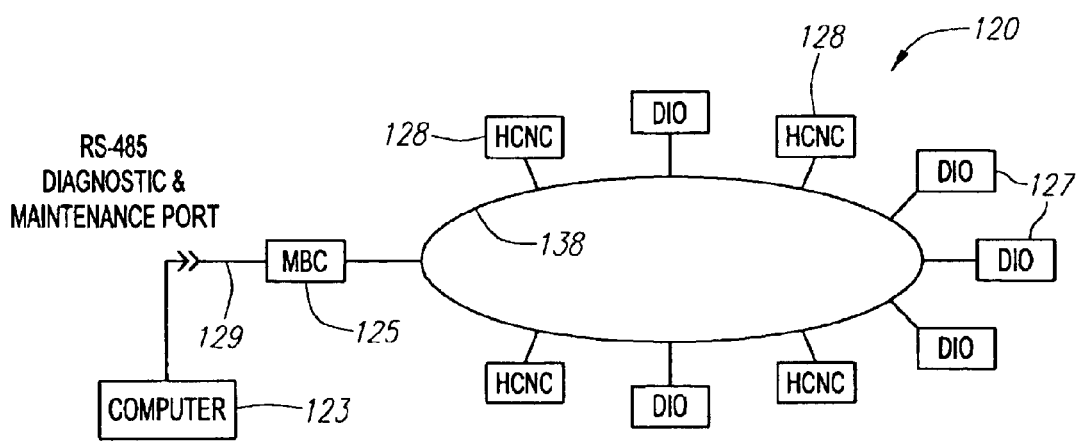
FIGS. 2, 3 and 4 are diagrams of different control networks as known in the art.
Figure 3:
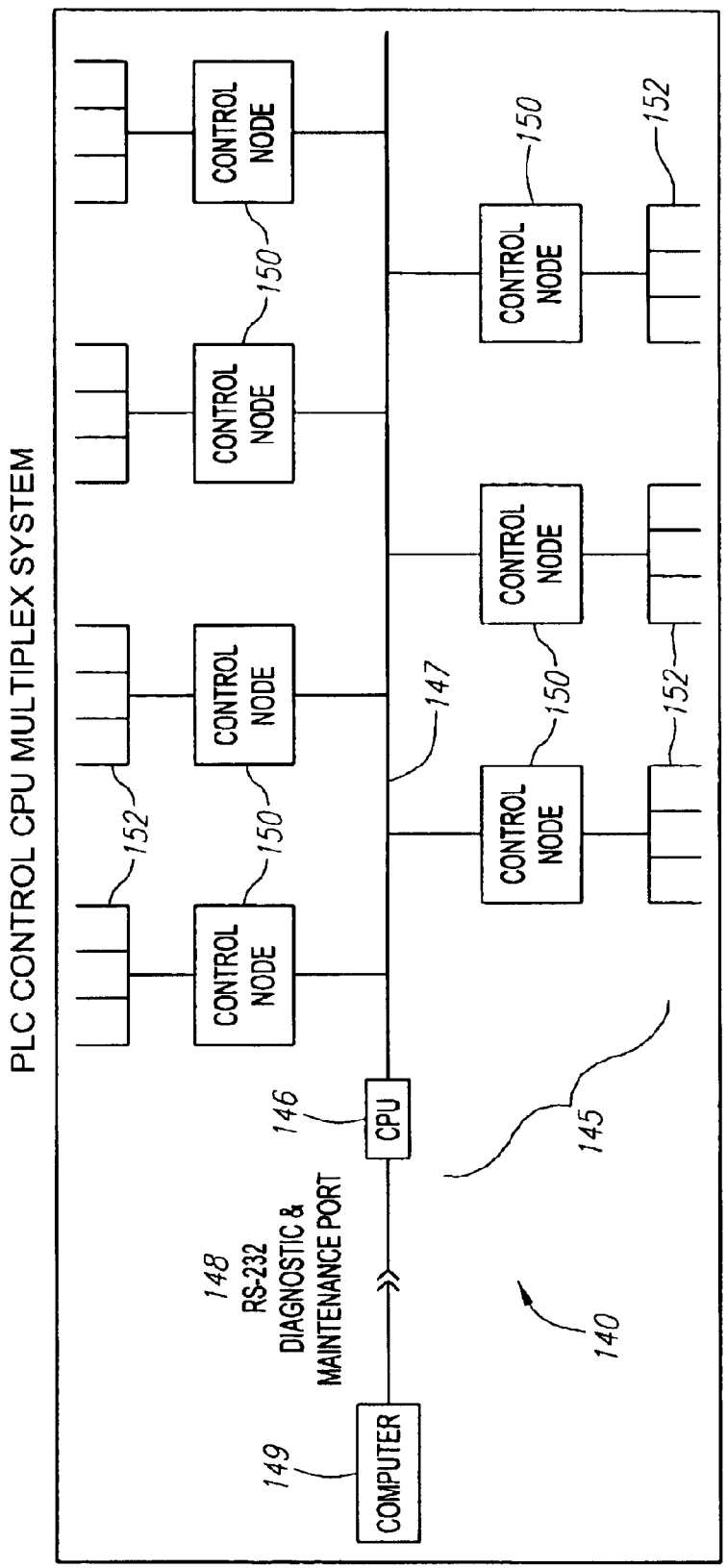
Figure 4:
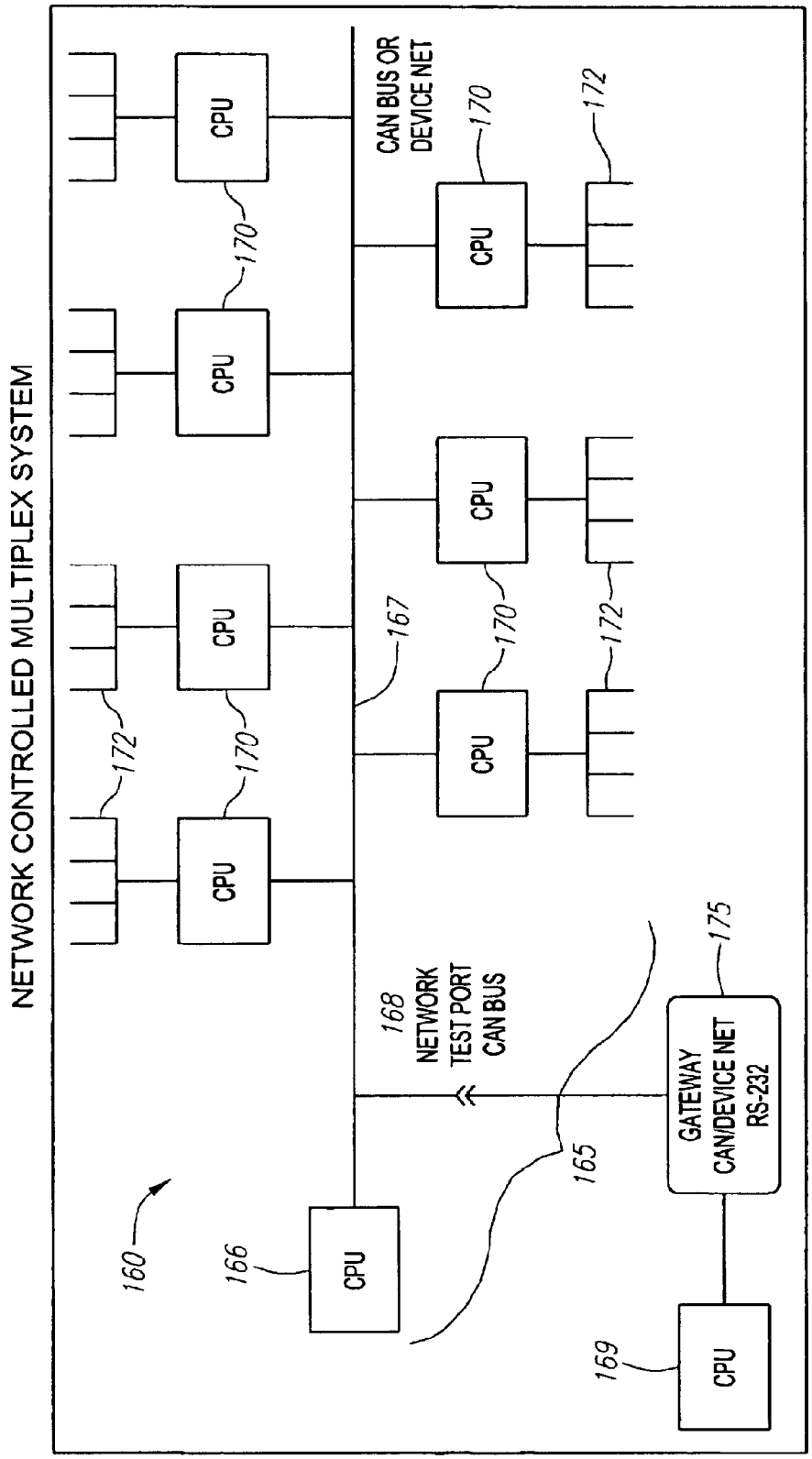

The control network 218 may take the form of any type of network, and may include, for example, a hierarchical master-slave control network such as depicted in FIG. 2, a PLC-based control network as depicted in FIG. 3, a CAN bus or device net control network as depicted in FIG. 4, or any other type of control network, including control networks that are fairly simple or substantially more complex than those depicted in FIGS. 2, 3 and 4. The wireless diagnostic and maintenance linking device 215 may itself connect to an existing diagnostic and maintenance port (such as ports 129, 148 and 168 illustrated in FIGS. 2, 3 and 4, respectively) of the control network 218, thereby being compatible with control networks 218 which have a built-in capability for connecting non-wirelessly to a test computer.

Figure 7:
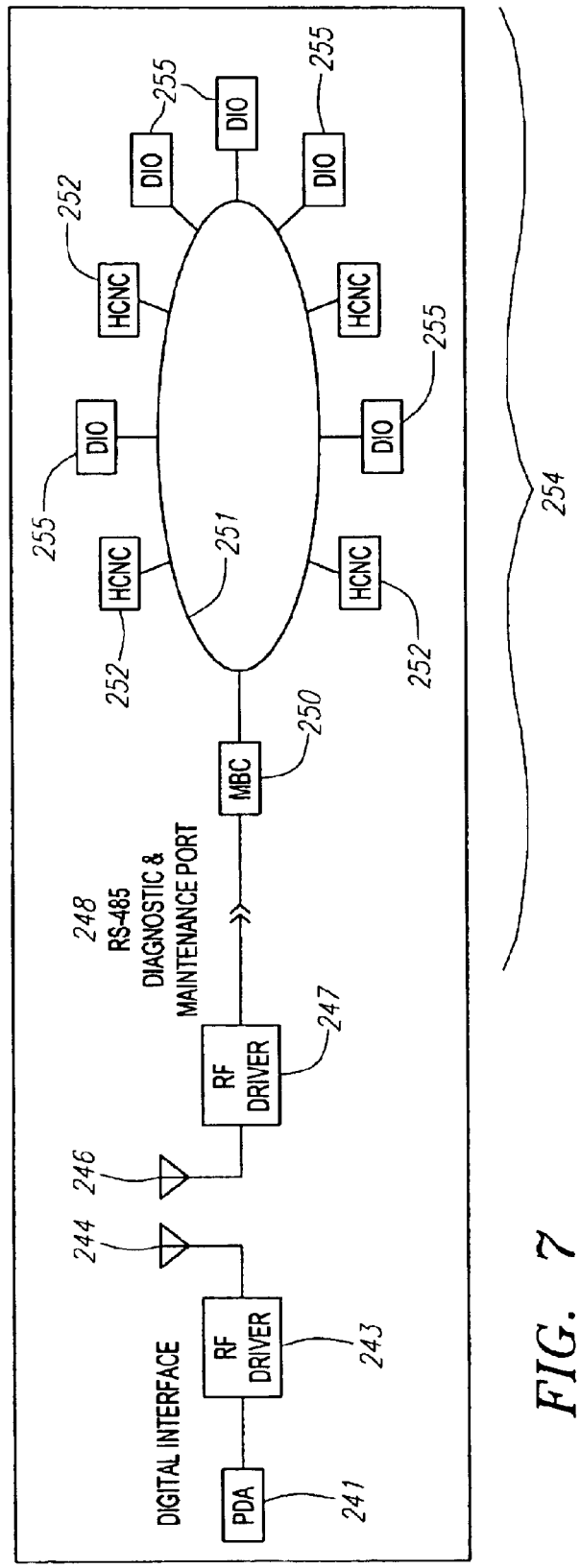
FIGS. 7, 8 and 9 are diagrams of the remote diagnostic system of FIG. 6 as applied to various different types of control networks.
Figure 8:
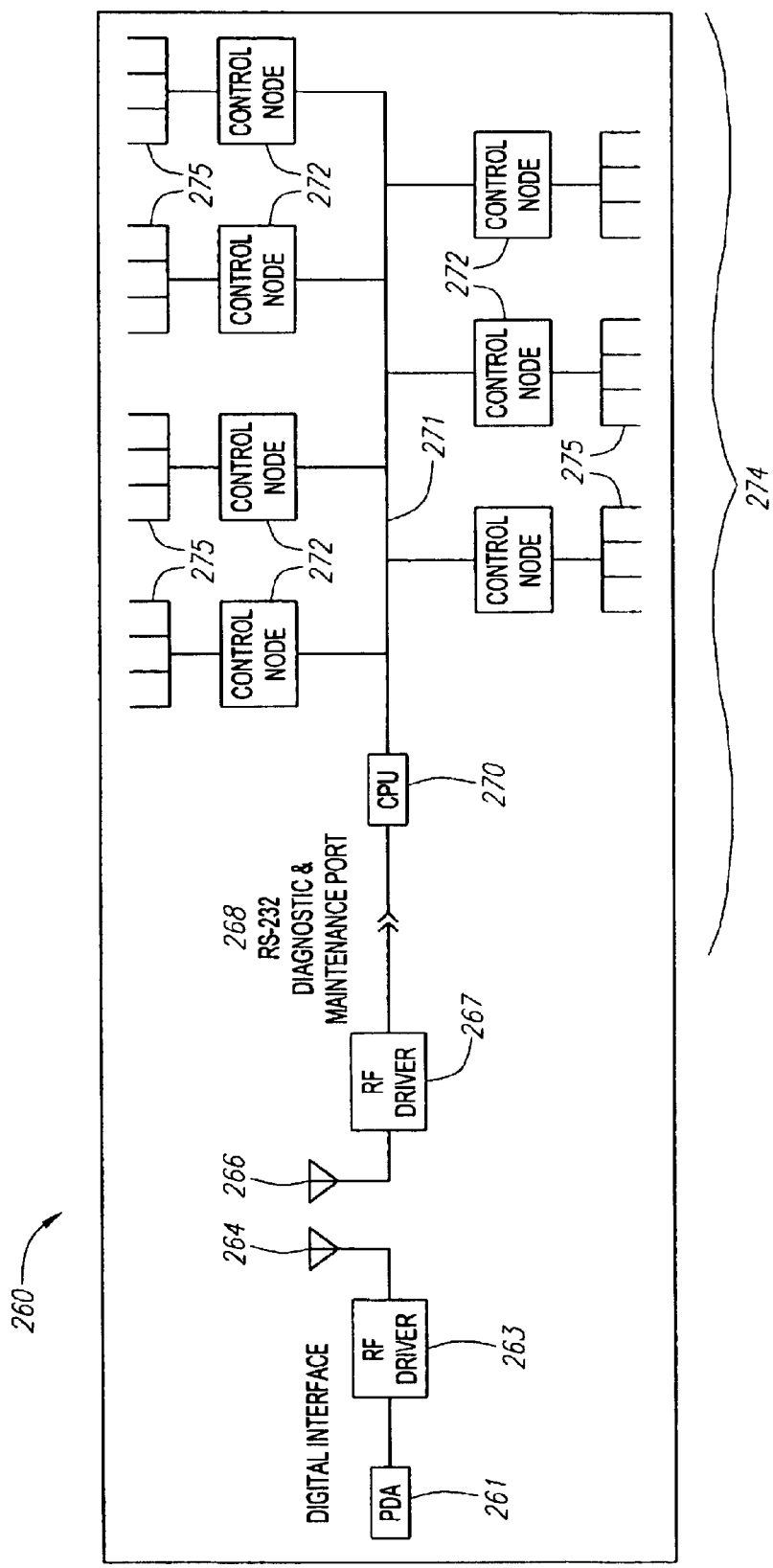
Figure 9:
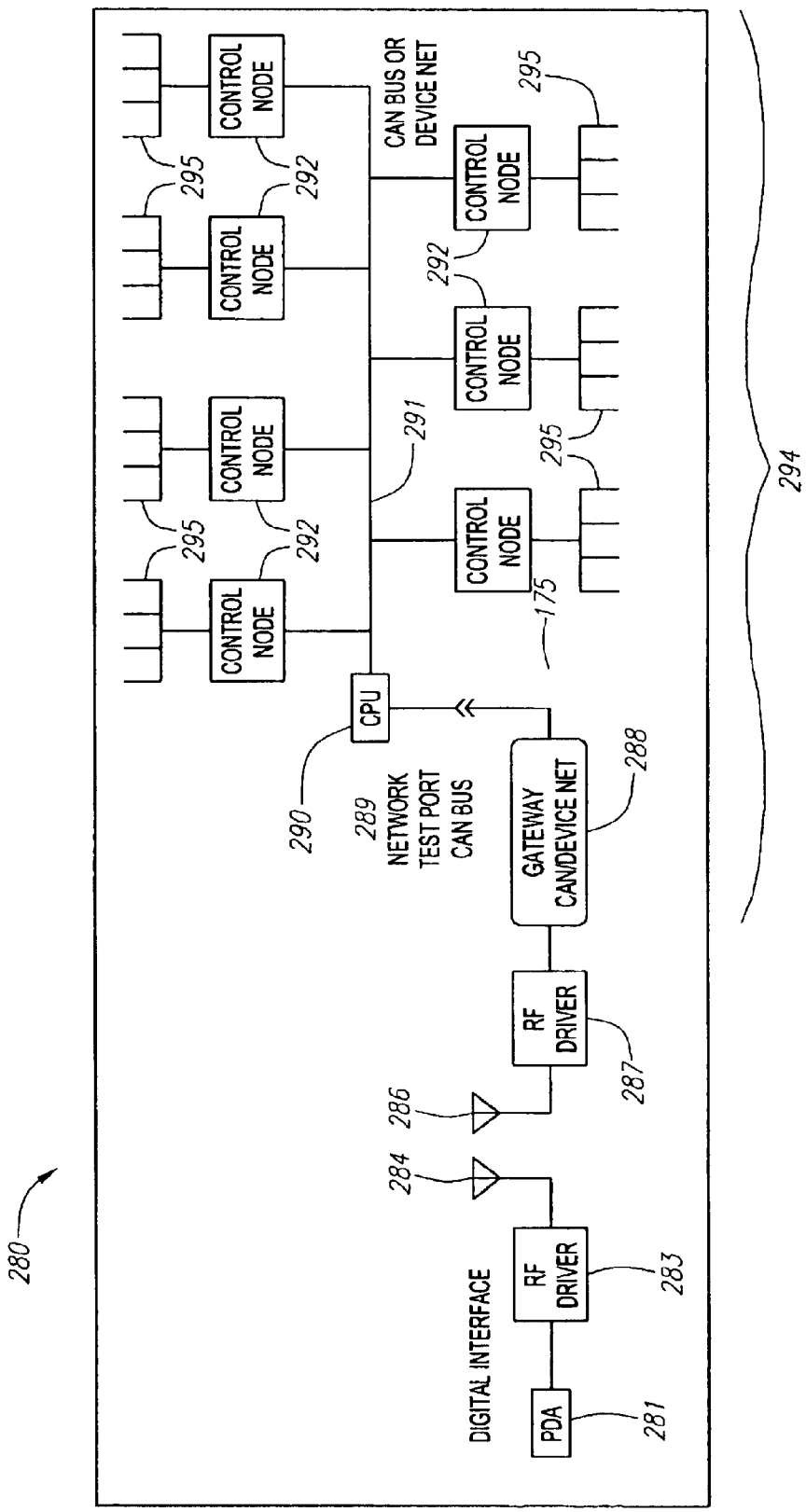

FIGS. 7, 8 and 9 are diagrams illustrating concepts of the remote diagnostic system 200 shown in FIG. 6 as applied to various different types of control networks 218. In FIG. 7, for example, is shown a control network system 240 wherein a handheld, computerized diagnostic device 241 (preferably embodied as a personal digital assistant (PDA)) communicates with a hierarchical, master-slave control network 254 over a wireless communication link. The computerized diagnostic device 241 is connected to a wireless intermediary unit 243 (preferably embodied as an RF driver) which preferably has, among other things, an antenna 244 for facilitating wireless RF communication. The computerized diagnostic device 241 sends commands and other instructions in a digital format to the wireless intermediary unit 243, which re-formats (if necessary) and modulates the data over an RF communication link. The wireless diagnostic and maintenance linking device 247 (also preferably embodied as an RF driver) receives the modulated data from the wireless intermediary unit 243, demodulates the received data and places it in a format compatible with the control network 254. In the example of FIG. 7, the control network 254 includes an RS-485 compatible diagnostic and maintenance port 248, and so the wireless diagnostic and maintenance linking device 247 would place the received information in a format compatible with the RS-485 protocol. However, any other type of interface between the wireless diagnostic and maintenance linking device 247 and the control network 254 may also be used.

In a similar fashion, the wireless diagnostic and maintenance linking device 247 receives information from the control network 254, re-formats the information (if necessary) and modulates it for communication over an RF communication link (which may be the same or different RF channel as utilized on the forward link). The wireless intermediary device 243 receives the modulated data from the wireless diagnostic and maintenance linking device 247, demodulates the received data and places it in a format compatible with the computerized diagnostic unit 241.

The control network 254 shown in FIG. 7 may comprise any hierarchical, master-slave network or loop configured network, and may have one or more common buses, arranged in a single-tier (if one bus) or a multi-tier, hierarchical architecture. Illustrative (but not exhaustive) examples of various types of control network architectures that be included as part of the control network 254 are illustrated and/or described in U.S. Pat. No. 5,907,486, Japanese Patent documents 10-326259 and 10-333930, and U.S. patent application Ser. No. 08/854,160 (entitled "Backup Control Mechanism In A Distributed Control Network"), Ser. No. 08/853,893 (entitled "Fault Isolation and Recovery In A Distributed Control Network"), Ser. No. 08/853,989 (entitled "Multi-Tier Architecture for Control Network"), and Ser. No. 09/442,368 (entitled "Control Network with Matrix Architecture"), all of which are assigned to the assignee of the present invention and hereby incorporated by reference as if set forth fully herein.

FIG. 8 is a diagram of a similar control network system 260 wherein a handheld, computerized diagnostic device 261 (preferably embodied as a personal digital assistant (PDA)) communicates with a PLC-based control network 274 over a wireless communication link. Similar to the control network system 240 shown in FIG. 7, in FIG. 8 the computerized diagnostic device 261 is connected to a wireless intermediary unit 263 (preferably embodied as an RF driver) which preferably has, among other things, an antenna 264 for facilitating wireless RF communication. The computerized diagnostic device 261 sends commands and other instructions in a digital format to the wireless intermediary unit 263, which re-formats (if necessary) and modulates the data over an RF communication link. A wireless diagnostic and maintenance linking device 267 (also preferably embodied as an RF driver) receives the modulated data from the wireless intermediary unit 263, demodulates the received data and places it in a format compatible with the control network 274. In the example of FIG. 8, the control network 274 includes an RS-232 compatible diagnostic and maintenance port 268, and thus the wireless diagnostic and maintenance linking device 267 would place the received information in a format compatible with the RS-232 protocol. However, any other type of interface between the wireless diagnostic and maintenance linking device 267 and the control network 274 may also be used.

A similar sequence of events occurs in the opposite direction to convey information from the control network 274 to the wireless diagnostic device 261. Thus, the wireless diagnostic and maintenance linking device 267 receives information from the control network 274, re-formats the information (if necessary) and modulates it for communication over an RF communication link (which may be the same or different RF channel as utilized on the forward link). The wireless intermediary device 263 receives the modulated data from the wireless diagnostic and maintenance linking device 267, demodulates the received data and places it in a format compatible with the computerized diagnostic unit 261.

FIG. 9 is a diagram of another control network system 280 wherein a handheld, computerized diagnostic device 281 (preferably embodied as a personal digital assistant (PDA)) communicates with a CAN bus (or device net) based control network 294 over a wireless communication link. Similar to the control network systems 240 and 260 shown in FIGS. 7 and 8, respectively, in FIG. 9 the computerized diagnostic device 281 is connected to a wireless intermediary unit 283 (preferably embodied as an RF driver) which preferably has, among other things, an antenna 284 for facilitating wireless RF communication. The computerized diagnostic device 281 sends commands and other instructions in a digital format to the wireless intermediary unit 283, which re-formats (if necessary) and modulates the data over an RF communication link. A wireless diagnostic and maintenance linking device 287 (also preferably embodied as an RF driver) receives the modulated data from the wireless intermediary unit 283, demodulates the received data and places it in a format compatible with the control network 294. In the example of FIG. 9, the control network 294 includes a CAN bus or device net compatible diagnostic and maintenance port 289 and a CAN bus or device net gateway 288, and thus the wireless diagnostic and maintenance linking device 287 would place the received information in a format compatible with the CAN bus or device net gateway 288. However, any other type of interface between the wireless diagnostic and maintenance linking device 287 and the control network 294 may also be used.

A similar sequence of events occurs in the opposite direction to convey information from the control network 294 to the wireless diagnostic device 281. Thus, the wireless diagnostic and maintenance linking device 287 receives information from the control network 294, re-formats the information (if necessary) and modulates it for communication over an RF communication link (which may be the same or different RF channel as utilized on the forward link). The wireless intermediary device 283 receives the modulated data from the wireless diagnostic and maintenance linking device 287, demodulates the received data and places it in a format compatible with the computerized diagnostic unit 281.

Figure 10:
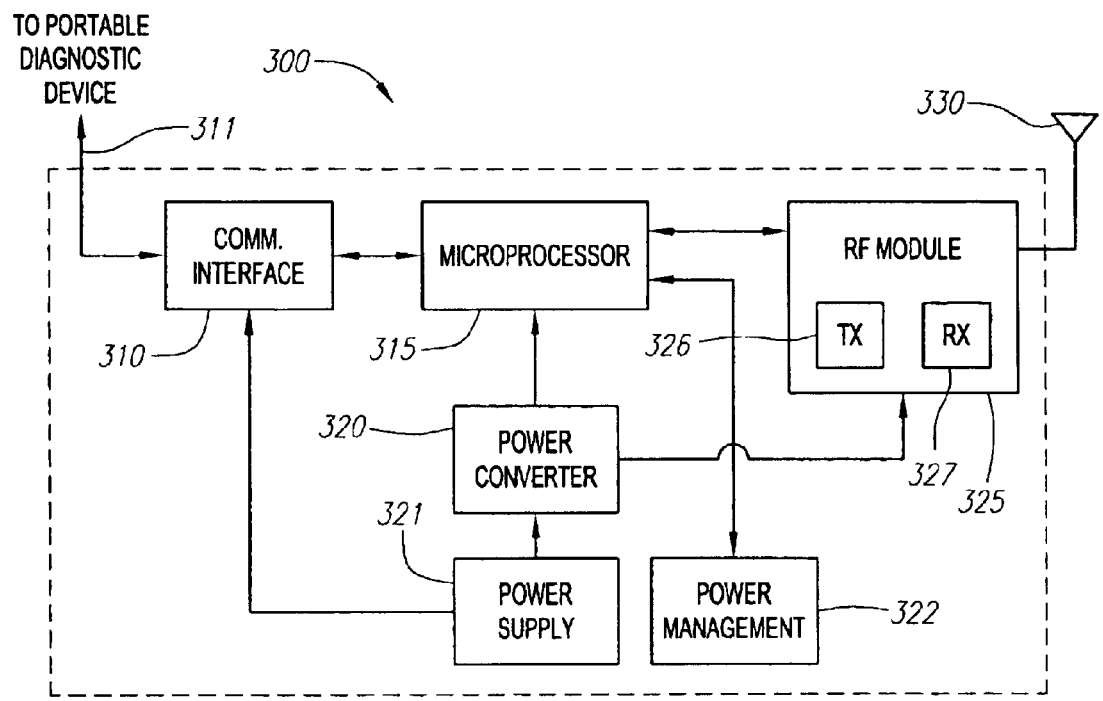
FIG. 10 is a diagram of a preferred wireless intermediary unit for connecting a remote diagnostic device to a control network, as may be used, for example, in any of the remote diagnostic systems depicted in FIGS. 6 through 9, and 26.

FIG. 10 is a diagram of a preferred wireless intermediary unit 300 for connecting a remote diagnostic device to a control network, as may be used, for example, in any of the remote diagnostic systems depicted in FIGS. 6 through 9 (for example, as wireless intermediary unit 205, 243, 263 or 283). As illustrated in FIG. 10, the wireless intermediary unit 300 preferably comprises a communication interface 310 which connects by a cord 311 to a portable computerized diagnostic device (such as any of the computerized diagnostic devices 201, 241, 261 or 281 shown in FIGS. 6, 7, 8 and 9, respectively). The nature of the communication interface 310 depends upon the nature of the computerized diagnostic device, and may be, for example, a serial interface (such as an RS-232 or Universal Serial Bus (USB) interface), a parallel interface or fiber optic interface. The communication interface 310 is connected to a microprocessor 315 (which includes any necessary RAM, ROM or peripheral components), which in turn connects to a communications module 325. The wireless intermediary unit 300 also preferably comprises a power sub-system (unless it receives power from an external source, such as the computerized diagnostic device), comprising a power supply 321, a power converter 320 and a power management circuit 322.

In a preferred embodiment, the communications module 325 communicates over radio frequencies, and thus is, in essence, an RF module. The communications module 325 preferably comprises a transmitter 236 and a receiver 327, and is preferably connected to an antenna 330. The receiver 327 may, for example, be a double conversion superheterodyne variety.

In operation, the wireless intermediary unit 300 acts as a wireless interface between a computerized diagnostic device and a control network. The wireless intermediary unit 300 receives information (preferably in a digital format) from the computerized diagnostic device over the communications interfaced 310, formats the information for transmission, and modulates the information over a wireless communication channel. The steps involved in formatting and modulating the information from the computerized diagnostic unit depend upon the format in which the information is received, the format in which the receiving device expects the information, and the nature of the physical link (i.e., the wireless communication channel). If the communications interface 310 to the computerized diagnostic device comprises a parallel interface, for example, then the microprocessor 315 may convert the incoming parallel data into serial data to facilitate transmission by the RF module 325. In any event, the microprocessor 315 and/or RF module 325 may add header bits, error correction and/or encoding to the message being transmitted. In the opposite direction, the RF module 325 and/or microprocessor 315 may demodulate, decode, error check and/or strip header bits from information received over the wireless channel from the control network.

In a preferred embodiment, the communications interface 310 comprises an RS-232 compatible interface, which has the advantage of allowing compatibility with many personal digital assistant (PDA) devices. The microprocessor 315 and/or communications interface 310 are preferably programmed so as to be compatible with a Windows CE™ or LINUX compatible platforms as may be used in the computerized diagnostic device to which the wireless intermediary device 300 is connected.

The RF module 325 may employ frequency modulation (FM) techniques and/or spread spectrum encoding and decoding of transmitted signals. The frequency band may be any that is suitable, such as, for example, 400 MHz, 300 MHz, 900 MHz, or 2.4 GHz. The frequency band may be determined by inserting the appropriate one of several RF module chips, or else may be made selectable by the operator using switch settings. A voltage-controlled oscillator (VCO) responsive to the switch settings may be used to generate the different frequencies. Alternatively, the switch settings may affect both frequency settings and communication protocols, so that the same wireless intermediary device 300 can be used for different types of control networks using different wireless communication interfaces. Each switch setting can correspond to a specific control network type, and thus be associated with a specific frequency band and communication protocol. The switch settings can be set manually through switches on the exterior of the wireless intermediary device 300, or else may be selected through various configuration options provided on the screen display of the computerized diagnostic device.

In one embodiment, the power sub-system provides power to the communication interface 310, microprocessor 315 and RF module 325. A power supply 321 includes a battery (which can be alkaline or lithium (rechargeable), for example) or other low voltage power source. In a preferred embodiment, the power supply 321 comprises a 3.6 volt battery. A power converter 320 is provided to the voltage level of the 3.6 volt battery to a 5 volt level suitable for the microprocessor 315 and RF module 325. The power management circuit 322, among other things, determines whether the battery level is high, medium or low. This information may be made available to the operator through one or more LEDs, a gauge, or LCD display, for example. As an alternative to an on-board power supply, 321, or in addition thereto, power may also be brought into the wireless intermediary device 300 from an external source, such as the computerized diagnostic device.

The wireless intermediary unit 300 preferably includes a lightweight, durable moisture-resistant housing or encasement that may be manufactured from any of a variety of materials, including, for example, plastic or aluminum (or other lightweight metal). The housing or encasement (not shown) of the wireless intermediary unit 300 preferably includes suitable means for allowing it to be physically carried by an operator (thus facilitating its transportability), such as, for example, a belt clip, or small hoops for allowing the fastening of a strap of similar means for securing the wireless intermediary unit 300 to the body of the operator. Alternatively, the operator may wear a belt having a pouch or pocket for placing the wireless intermediary unit 300. Because it is generally advantageous for an operator to be able to carry around the wireless intermediary unit 300, it is preferably small in size, with on-board components integrated to the extent reasonably possible. It should be possible to manufacture the necessary circuitry and components for the wireless intermediary unit 300 in a size similar to that of conventionally available cellular or pocket telephones, many of which contain microprocessors, RF circuitry and a local power supply.

It should be noted that generally the wireless intermediary unit 300 will connect to the computerized diagnostic device by a cord, cable, wire or other physical means, but in some circumstances a wireless connection between the wireless intermediary unit 300 and the computerized diagnostic device may be desirable, thus providing a "personal area network" associated with the operator.

Referring once again to the top-level block diagram in FIG. 6, in accordance with one or more embodiments as disclosed herein, the computerized diagnostic device 201 is programmed to test, monitor and/or diagnose a control network 218 by communicating to the control network 218 through the wireless intermediary device 205. The computerized diagnostic device 201 preferably comprises a graphical screen display for displaying images, text and other information to the operator useful for testing, monitoring and/or diagnosing the control network.

Figure 11:
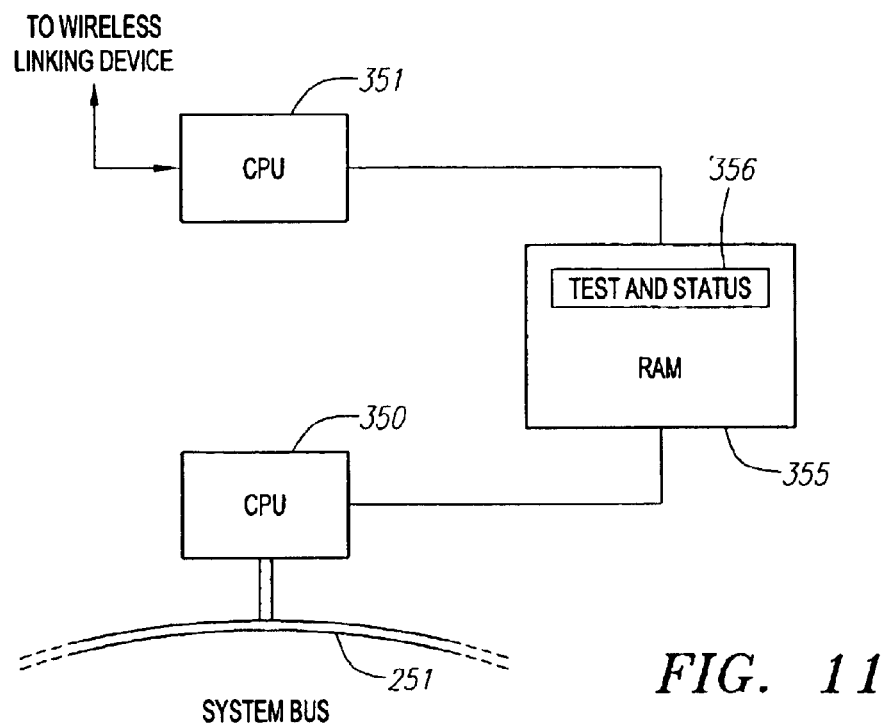
FIG. 11 is a block diagram illustrating an embodiment of a master bus controller having two independent processors.

An example of operation of the computerized diagnostic device 201 may be illustrated with respect to the control system 240 shown in FIG. 7, which, it will be recalled, depicts a hierarchical, master-slave control network 254. In this particular example, the master bus controller (MBC) 250 of the control network 254 normally operates in a master mode with respect to the common bus 251, while the other network nodes 252, 255 normally operate in a slave mode with respect to the common bus 251. The master bus controller 250 preferably comprises a pair of independent processors 350, 351, a first processor 350 which connects to the common bus 251, and a second processor 351 which connects to the diagnostic and maintenance port 248, as illustrated in FIG. 11. The first processor 350 acts as a master with respect to the common bus 251, while the second processor 351 acts as a slave (i.e., listener) with respect to the diagnostic and maintenance port connection. Both processors 350, 351 are connected to a dual-port RAM 355, which stores, among other things, a test mode status variable 356 indicating whether the master bus controller 250 is in test mode or not. When a test, diagnosis or other analysis of the control network 254 is desired, the operator initiates the appropriate commands through the computerized diagnostic device (preferably using techniques described later herein), causing a mode switch instruction to be relayed via the wireless intermediary device 243 and wireless diagnostic and maintenance linking device 247 to the master bus controller 250. The mode switch instruction is received by the second processor 351, which interprets the instruction and, in response thereto, switches the test mode status variable 356 to indicate that the master bus controller 250 is now in test mode. The first processor 350 polls the test mode status variable 356 periodically (e.g., once per millisecond), and, when it observes that the state of the test mode status variable 356 has switched, enters the test mode.

Once the test mode is entered, the master bus controller 250 may operate with reduced functionality as compared to its normal monitoring, command and control duties, or may cease performing any monitoring, command and control functions altogether, depending upon how it is programmed and the criticality of those functions. The first processor 350 then continually checks for instructions sent from the computerized diagnostic device 241, which are relayed to it by the second processor 351 and stored in the dual-port RAM 355 in predefined locations. When the first processor 350 receives an instruction when in the test mode, it carries it out and awaits the next instruction. When the test operation is complete (or when the wireless communication link is broken), the second processor 351 returns the test mode status variable 356 to its original (i.e., non-test mode) state. The first processor 350, which continues to poll the test mode status variable 356 when in the test mode, eventually observes that the test mode status variable 356 has returned to its original state, and, in response thereto, resumes its normal monitoring, command and control duties.

A variety of other techniques may be used to cause the master bus controller 250 to respond to instructions from the computerized diagnostic device 241. For example, the master bus controller 250 may comprise only a single processor, and the wireless diagnostic and maintenance linking device 247 may have direct memory access to a test mode status variable stored in the RAM of the master bus controller 250. Alternatively, the master bus controller 250 may receive an interrupt from the wireless diagnostic and maintenance linking device, and may then check a predefined instruction buffer to receive test instructions originating from the computerized diagnostic device 241. A variety of other techniques may also be used. Similar techniques may also be used to initiate test mode operations with any other type of control network (including the control network systems 260 or 280 shown in FIGS. 8 and 9, respectively).

Further functions and features of the computerized diagnostic device 201 will now be described, with particular reference to FIG. 12, which illustrates a preferred such device 201 embodied as a personal digital assistant (PDA) 420, such as a commercially available PalmPilot® or other handheld computer device. While this embodiment is described with respect to a PDA device, it will be understood by those skilled in the art that any other type of device having the same functionality may be substituted for the PDA device.

In a preferred embodiment, the personal digital assistant 420 is based on a platform running Windows CE®, LINUX, or another suitable operating system 424 capable of supporting the operations of a handheld graphical computing device. The personal digital assistant 420 also preferably comprises a communication interface 428, which is used to communicate with the wireless intermediary unit 430 through, for example, a direct wired connection 432 (but alternatively, through a wireless connection 434 such as a radio frequency (RF) or infrared (IR) connection). The personal digital assistant 420 also preferably includes a graphical screen display 422, which may, for example, support a Graphical User Interface (GUI) for allowing user interaction, and further includes one or more application programs 426 which provide the programming instructions for executing a variety of the test and diagnostic functions programmed into the personal digital assistant 420.

Some of the test and diagnostic functions that may be included are as follows. The personal digital assistant 420 may allow the user to view various aspects of the control network graphically on the screen display 422. The displayed images may include, for example, illustrations of all or part of the control network within the context of the controlled facility (e.g., a building, vehicle, plant, robot, machine or other facility), so as to facilitate the user's testing, monitoring and/or diagnosis of the control network. The image of the facility may be presented on the screen display 422 in a faint outline or phantom format, while the control network may appear in solid, dark lines, thus allowing the user to easily distinguish the facility from the components of the control network being observed or tested.

The personal digital assistant 420 may also provide the ability for an operator to force individual components in the control network system to a desired output state. By entering various inputs, the operator may cause test instructions to be conveyed wirelessly from the personal digital assistant 420 to the control network 218, whereupon the test instructions are relayed to the appropriate individual component(s) of the control network system. In the absence of any fault of component failure, the component should change states to the desired output state in response to receiving the proper instruction. The personal digital assistant 420 may be programmed to receive feedback from the control network 218 over the wireless connection, and to display (in a ladder format, e.g.) the states of the relevant switches, actuators or relays along the signal path to the network component being tested or observed. The personal digital assistant 420 may be programmed with information pertaining to the locations of various network components in the control network 218 and their connectivity, thereby simplifying diagnosis or testing by the operator, and reducing or eliminating the need for the operator to carry and interpret bulky, cumbersome manuals and circuit blueprints.

The personal digital assistant 420 may also provide an automated procedure for testing the connection between it and the wireless intermediary device 205 (or 430 in FIG. 12), and another automated procedure for testing the wireless connection between the wireless intermediary device 205 and the control network 218.

Details of the above functions, and additional test and diagnostic functions, are provided below.

Figure 12:
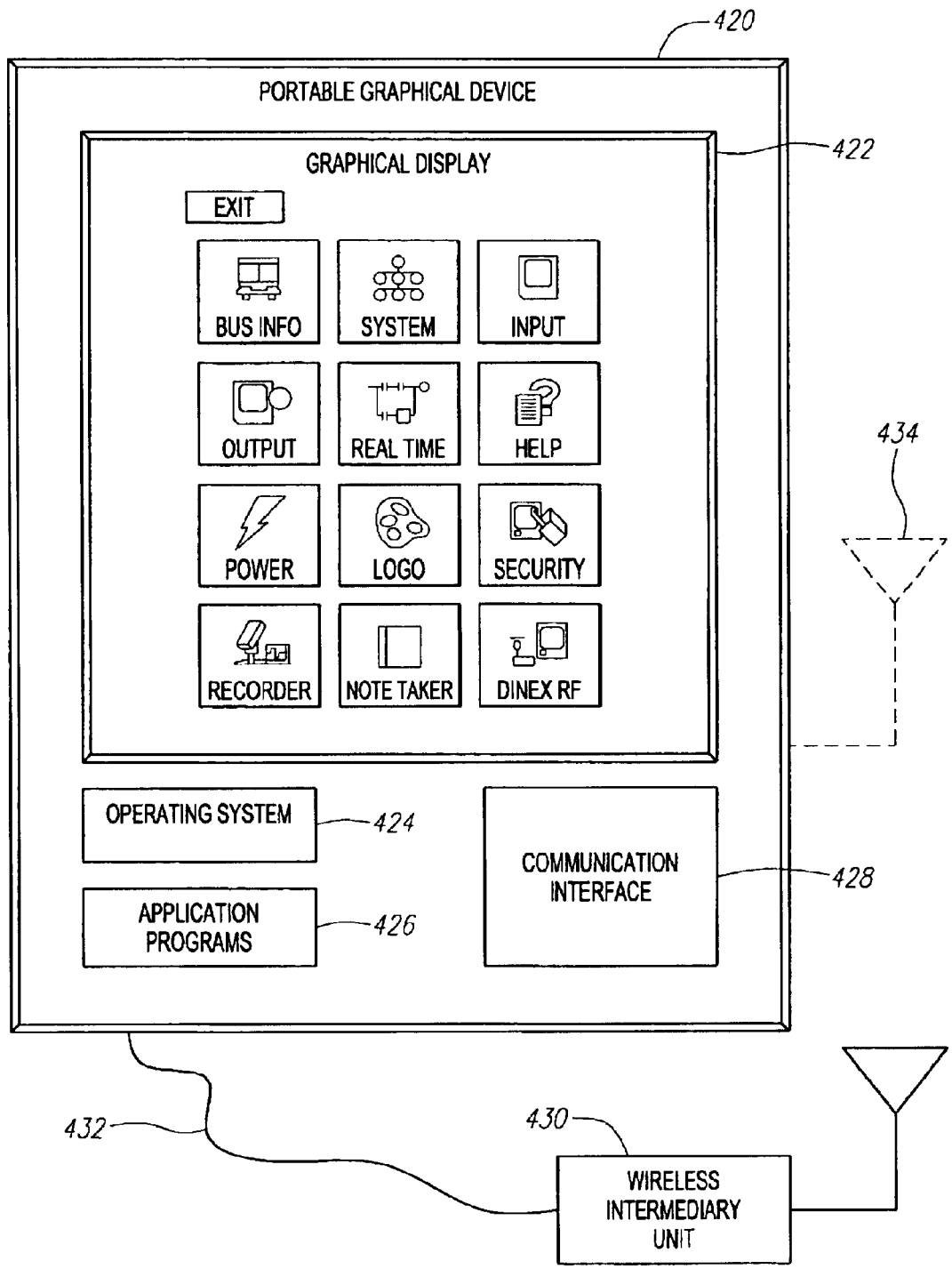
FIG. 12 is a diagram of a preferred handheld, computerized diagnostic device embodied as a personal digital assistant.
Figure 22:
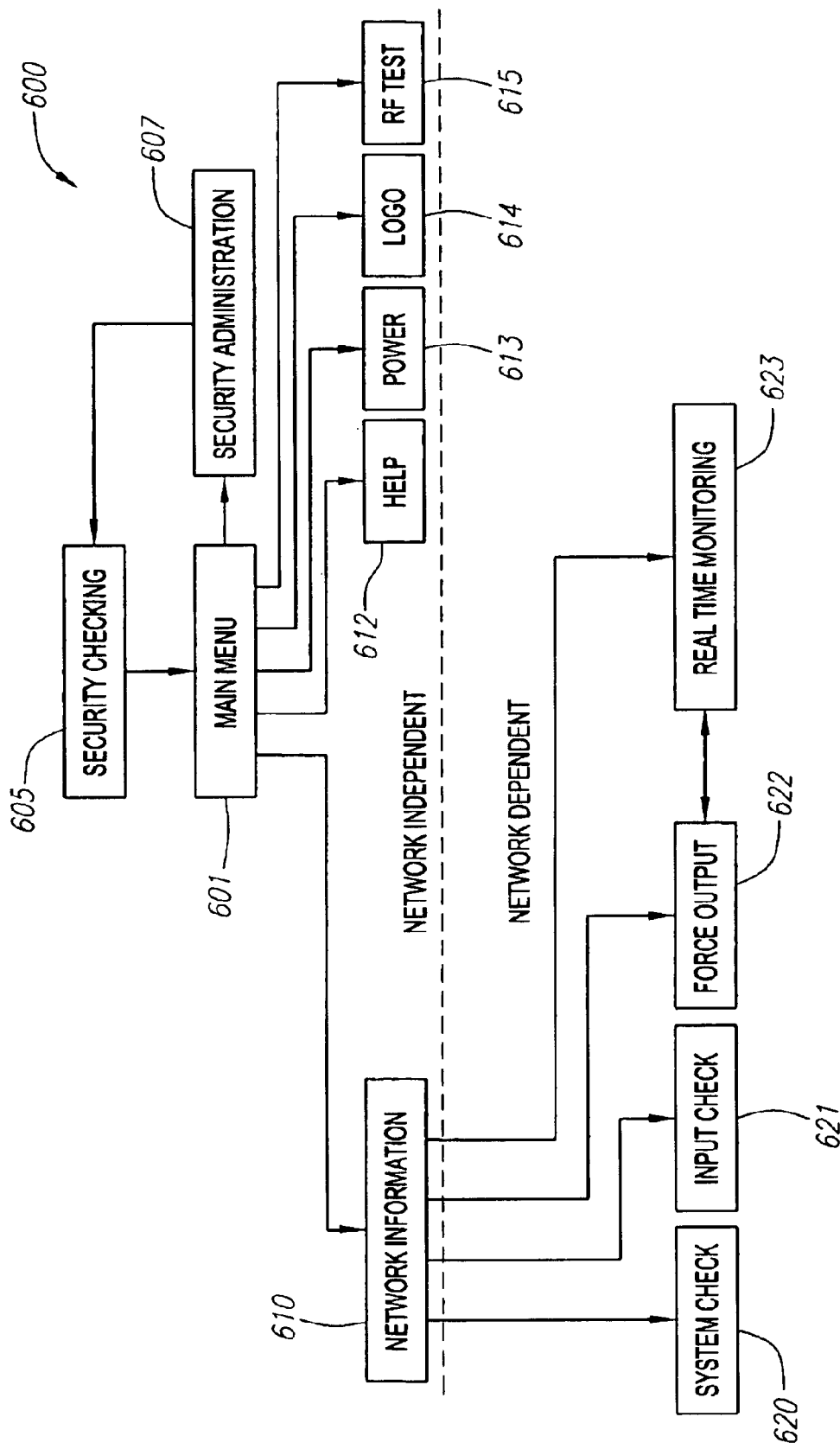
FIG. 22 is a software architecture diagram as may be used in the computerized diagnostic device illustrated in FIG. 12.

FIG. 22 is a diagram of a preferred software system architecture as may be used in the computerized diagnostic device illustrated in FIG. 12. As illustrated in FIG. 22, the software system architecture 600 comprises a security checking function 605, a main menu function 601, and a security administration function 607, which preferably (but need not) collectively comprise a software loop as illustrated. The main menu function 607 calls any of a number of subsidiary functions, including a network information function 610, a help function 612, a power function 613, a logo function 614 and an RF test function 615. All of the foregoing functions 601, 605, 607, 610, 612, 613, 614 and 615 may be viewed as "network independent" in the sense that they do not depend upon the nature of the control network being tested or diagnosed. The network information function 610 in turn accesses a variety of additional subsidiary functions, including a system check function 620, an input check function 621, a force output function 622, and a real-time monitoring function 623. These latter functions 620, 621, 622 and 623 may be viewed as "network dependent" in certain aspects because they may depend or can be optimized for particular network configurations, types or implementations. Further details regarding the software functions appearing in FIG. 22 will be described or become apparent in the discussion of the test and diagnostic functions of the personal digital assistant 420.

Figure 15:
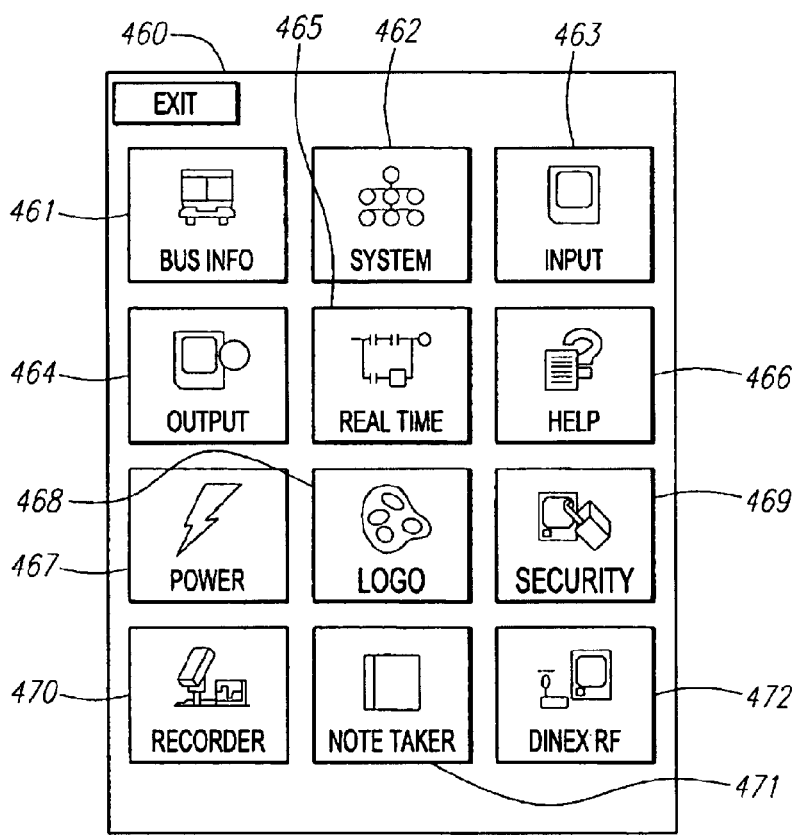
FIG. 15 is an example screen image of a main menu as may be used, for example, in the computerized diagnostic device illustrated in FIG. 12.

A diagnostic system menu screen 460, as illustrated in FIG. 15, preferably allows a user to initiate various test and diagnostic functions relating to the control network 218, as well as to perform various software system administrative functions. The test and diagnosis application software may have pre-programmed security functions designed to prevent unauthorized access to the diagnostic system main menu 460. Examples of security features are described below.

Figure 16:
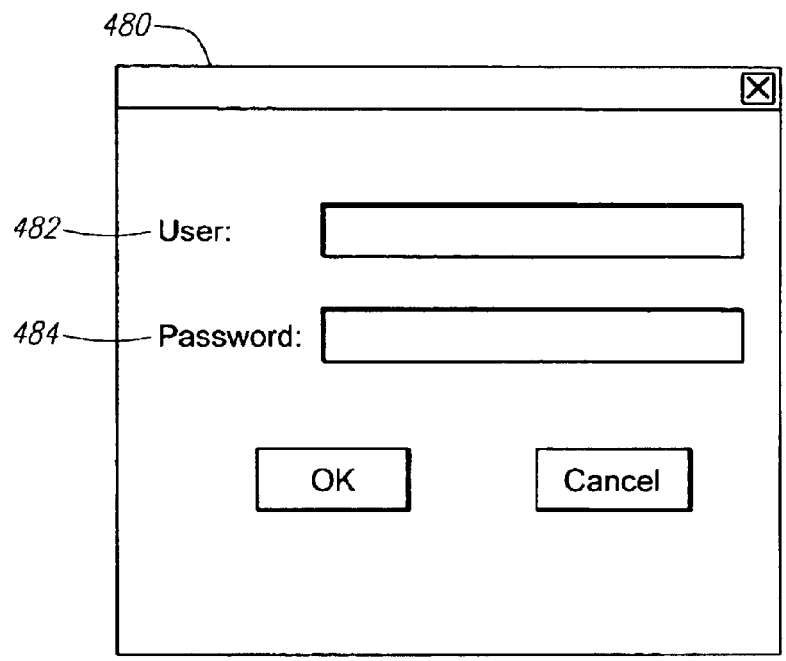
FIG. 16 is an example of a logon screen as may be used, for example, in the computerized diagnostic device illustrated in FIG. 12.

In a preferred embodiment, the security checking function 605 of the personal digital assistant 420 is invoked during initial user access, and also may be accessed via user selection of a security function icon from a diagnostic system main menu (see FIG. 15). The application program relating to the test and diagnosis features of the personal digital assistant 420 may be launched according to any acceptable procedure provided by the operating system 424, and is conveniently accomplished by user selection of an icon relating to the control network test and diagnosis application software. When a user initially launches the control network test and diagnosis application software, or when the personal digital assistant 420 is powered on with the diagnostic system main menu 460 running, a logon screen 480, as illustrated in FIG. 16, is preferably displayed, prompting the user to enter a logon identification (ID) string in a user ID field 482 and password in a password field 484 in order to gain operational access to the control network test and diagnosis application software. The security checking function 605 then attempts to verify the logon ID string and password. If the security checking function 605 is able to verify the logon ID and password, the user is then allowed to access the screen displaying the diagnostic system main menu 460, including the associated test and diagnostic system functions. An example of a diagnostic system main menu is illustrated in FIG. 15. If the user's logon ID and password cannot be verified, the user is denied access to the features provided by the test and diagnosis application software. Preferably, the security checking function 605 also continuously monitors each individual user's activity, and logs off any user who has been inactive for a predetermined period of time. This automatic log-off timeout function reduces the likelihood that an unauthorized person can access the test and diagnostic application software by using a personal digital assistant 420 which has not been properly logged off.

A variety of icons 461 through 472 are shown in the exemplary diagnostic system main menu 460 illustrated in FIG. 15. Rather than icons, textual strings may be displayed, listing the various available functions. The icons 461 through 472, however, are convenient from a user standpoint, and may be selected by, for example, a wand device, user contact (if a touch screen), pressing an appropriate keyboard key (for example, entering the first letter(s) of the desired function, or using the arrow keys to the appropriate icon and pressing enter), vocalizing the desired input (if a microphone and speech recognition software are provided), or by any other selection means provided within the functionality of the personal digital assistant 420. The precise manner of selecting the various icons or functions of the test and diagnosis application software is not important to the overall operation of the invention in its various embodiments as described herein.

A user may invoke various security functions by selecting the Security icon 469 from the system main menu 460, shown in FIG. 15. If a user has privileges associated with a system administrator, then selecting the Security icon 469 from the main menu 460 may enable the user to perform various system administration functions, such as, for example, adding a new user ID and password, deleting a user ID, or modifying an existing user's password 484. If the user logs on using a standard user logon ID (as opposed to a system administrator user ID), selecting the Security icon 469 from the main menu 460 may enable the user to perform certain system administrative functions unique to that individual, such as, for example, modifying his or her existing password 484.

The diagnostic system main menu 460 illustrated in FIG. 15 is particularly tailored, in this example, to the transit vehicle industry, but may be tailored to any industry, or else may be made generic. In this particular embodiment, however, a bus (i.e., transit vehicle) information icon 461 is provided as part of the diagnostic system main menu 460. Alternatively, the bus information icon 461 may be replaced by a control network information icon, to make its functionality more generic. A primary purpose of the bus information icon 461 is to allow the user to identify which transit vehicle (i.e., bus) type will be tested and/or diagnosed, and, further, which specific transit vehicle within that transit vehicle type will be tested and/or diagnosed.

Figure 17:
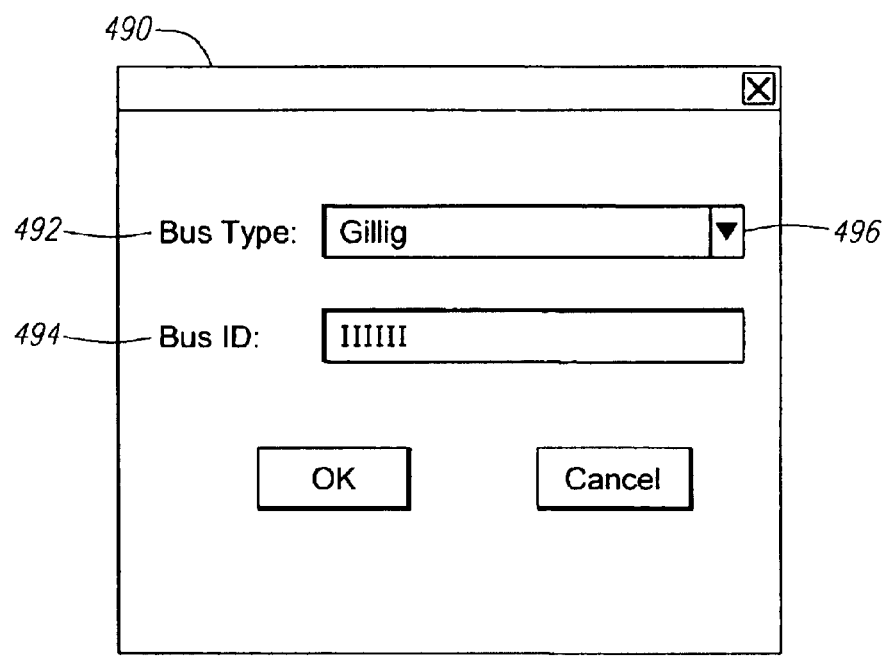
FIG. 17 is an example of a bus information input screen as may be used, for example, in the computerized diagnostic device illustrated in FIG. 12.

When the user selects the bus information icon 461 from the diagnostic system main menu 460, a bus information input screen 490 is preferably displayed, as illustrated in FIG. 17. The user may then enter a transit vehicle type (or control network type, more generically) in a transit vehicle type field 492, and a transit vehicle identification (ID) number (or control network ID, more generically) in a transit vehicle ID field 494, which identifies the particular vehicle (or other structure or facility) to be serviced. The transit vehicle type 492 may be entered by the user (using a numeric keypad in connection with a wand, for example), or alternatively may be selected from a drop down menu (invoked by selecting a drop down menu button 496) listing available transit vehicle types. For any given transit vehicle type, many individual transit vehicles may exist. Entry of a unique transit vehicle ID in the transit vehicle ID field 494 identifies the specific vehicle to be serviced. The network information function 610 (see FIG. 22) preferably manages the foregoing transit vehicle or control network information functions. It preferably responds to the entry or modification of the transit vehicle ID by verifying that the specified vehicle exists (i.e., is recognized by the test and diagnosis application software) and that a communications connection to that vehicle can be established.

In a preferred embodiment, when the user has selected the specific transit vehicle ID and it has been recognized by the network information function 610, the personal digital assistant 420 attempts to communicate with the control network 218 of the selected transit vehicle through establishment of a wireless connection by the wireless intermediary unit 205 (or 430, as depicted in FIG. 12). If the control network 218 of the specified transit vehicle does not respond to the wireless intermediary unit 205 (or 430), then an error message may be displayed on the screen image of the personal digital assistant 420, indicating a communications link failure. Such a failure may be caused by a variety of circumstances, including, for example, that 1) the specified transit vehicle is not within range of the wireless intermediary unit 205 (possibly because an incorrect transit vehicle ID is entered), or 2) the communications link itself failed due to mechanical malfunction.

If the specified transit vehicle (or control network) type and transit vehicle (or control network) ID are verified by the network information function 610, and, optionally, if a communications link is established to the control network 218, the network information function 610 may then ensure that the relevant transit vehicle (or control network) information is available to the personal digital assistant 420. For example, the network information function 610 may examine a data storage component (such as an internal ROM/PROM/EEPROM chip or memory card, including a plug-in "flashcard" or flash memory card, a CD-ROM, an insertable memory cartridge, or a disk, to name a few examples) to determine whether the relevant transit vehicle (or control network) information is available. The data storage component may store information relating to a single transit vehicle (or control network), or multiple transit vehicles (or control networks). If the information pertaining to the selected transit vehicle (or control network) is not found on the data storage component, then the network information function 610 may cause a message to be displayed on the display screen 422 requesting the user to insert or otherwise provide the necessary data storage component (i.e., "Please insert the memory cartridge [or memory card] for the Alpha bus"). Alternatively, the user may download such information from a host computer (not shown).

As yet another alternative, the personal digital assistant 420 may attempt to automatically download the control network information from a remote host computer. To this end, the personal digital assistant 420 may be configured with its own wireless communication interface through which it makes a connection to a remote host computer at which the relevant control network information is stored. For example, in relation to the wireless diagnostic and control system 700 illustrated in FIG. 27, the personal digital assistant 420, which could be associated with one embodiment of the portable diagnostic equipment 730 in FIG. 27, may connect to the local area network 754 and download information from the diagnostic and maintenance information database 780. As a variation of this technique, the wireless intermediary device 205 (or 430) may be provided with means for establishing a separate wireless communication link to a remote host computer at which the relevant control network information is stored. For example, in relation to the wireless diagnostic and control system 700 illustrated in FIG. 27, the wireless intermediary device 205 (or 430), which could be associated with one embodiment of the portable diagnostic equipment 730 in FIG. 27, may connect to the local area network 754 and download information from the diagnostic and maintenance information database 780.

Assuming the transit vehicle (or control network) information is available to the personal digital assistant 420, the personal digital assistant 420 returns to the main menu function 601 and displays the diagnostic system main menu 460 for the user to select desired diagnostic functions to be performed on the vehicle.

Figure 14:
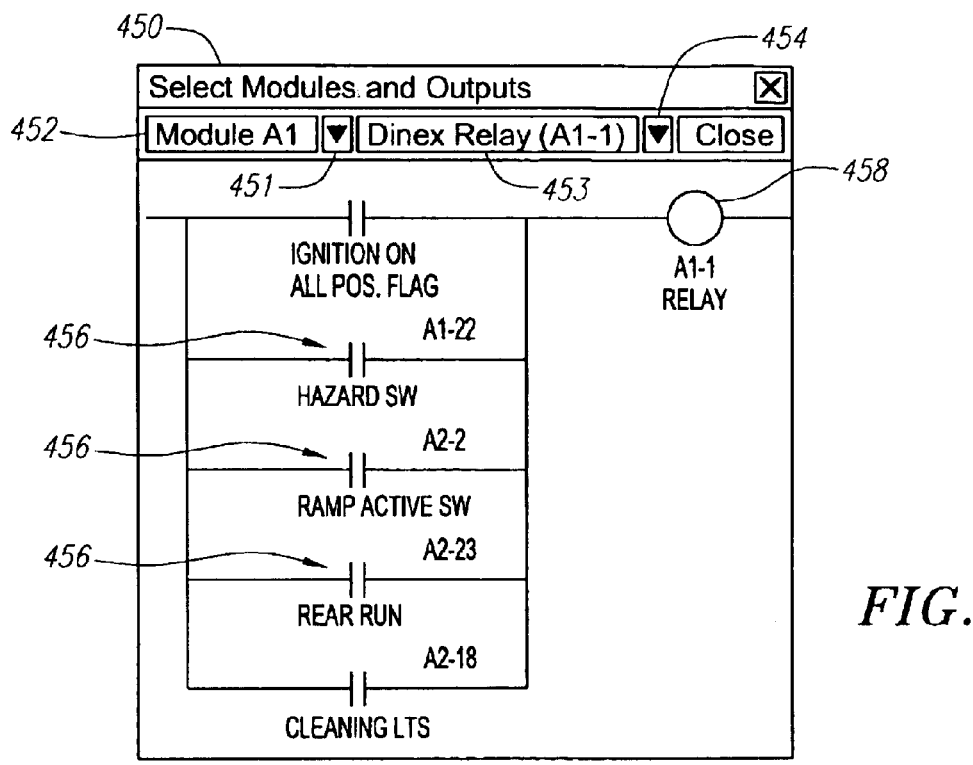
FIG. 14 is an example of a screen image depicting various control network components illustrated in a logic ladder format.

Once the control network (e.g., transit vehicle) type and specific ID are selected, the user may thereafter perform a variety of test or diagnostic activities utilizing the personal digital assistant 420. In a preferred embodiment, selection of a system check icon 462 allows the user to graphically observe a diagram of the control network 218, preferably within the context of the associated transit vehicle or other facility (e.g., building, plant, robot, etc.). In a preferred embodiment, in response to selection of the system check icon 462, and as illustrated in FIG. 14, some or all of the network nodes 442 of the control network 218 are graphically displayed on screen display 422 of the personal digital assistant 420 in dark, solid lines, superimposed on a three-dimensional (3-D) transparent or phantom outline image 440 of the transit vehicle (or other structure or facility which houses the control network 218). Each of the network nodes 442 in the control network may be numbered or otherwise designated with a unique identifier (e.g., A1, A2, B1 and so on) for identification by the user. Graphical display in this manner assists the user in identifying and locating various network nodes of the control network 218, by showing their relative positions within the image 440 of the transit vehicle (or other facility).

The graphical information relating to the image 440 and the network nodes 442 is preferably stored on (or downloaded to) a data storage component within the personal digital assistant 420. As noted previously, this information may be stored in ROM, PROM, EEPROM, CD-ROM, memory cartridge, or any other data storage means accessible to the personal digital assistant 420. In a preferred embodiment, sufficient graphical information is provided such that the image 440 of the transit vehicle (or other facility) is fully rotatable, thus allowing the user to change the view to correspond to wherever the user happens to be positioned in relation to the vehicle. The user may be allowed, in some applications, to zoom in or out of the screen image. Likewise, alternative view might be provided, such as an internal view versus an external view, and the user may be provided with means to select a particular view.

Selection of the system check icon 462 by the user may also result in a diagnostic test being initiated by the system check function 620 (see FIG. 22) of the application software running on the personal digital assistant 420. For example, each of the network nodes 442 in the control network may be systematically tested by the control network, according to an instruction relayed from the personal digital assistant 420 to the control network 218 over the wireless communication channel via the wireless intermediary device 205. This diagnostic test may run in a continuous loop until terminated by the user by hitting, for example, an Exit button 443. Control nodes 442 identified as malfunctioning during this diagnostic analysis may be illustrated on the screen display 422 in a distinguishable manner from properly functioning control nodes 442. This can be accomplished in various ways, such as by shading the malfunctioning control nodes 442 in a color different than the normally operating control nodes 442, or by causing the malfunctioning control nodes 442 to blink on the graphical display 422, or by any other visual or graphical means. Detection of a malfunctioning control node 442 during system check may also result in display of an error message on the personal digital assistant 420 alerting the user of the problem. Once a malfunctioning control node 442 is serviced or replaced, the displayed error message is cleared, and the nature of the network node image returns to its original display state.

While the image 440 of the transit vehicle or other facility is preferably displayed transparently and in 3-D, in various applications this type of graphical display may not be necessary or desired. Therefore, the image 440 being displayed may be a schematic diagram, or a two-dimensional image, if desired.

As further illustrated in FIG. 13, the image display software utilized in connection with the check system function 620 also preferably allows a text layer (such as "A1", "A2", "B1", etc.) to be superimposed on the image 440 appearing on the screen display 422. The text overlay may be used to provide identifying information for the various network nodes 442, or to provide other information to the user.

Figure 18:
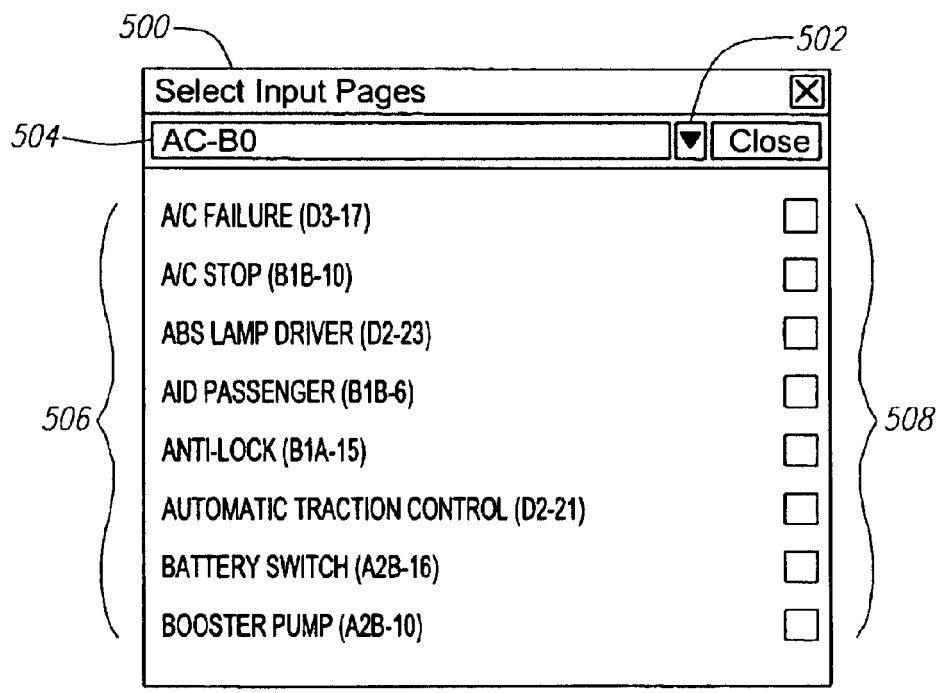
FIG. 18 is an example of an input check select screen as may be used, for example, in the computerized diagnostic device illustrated in FIG. 12.

Other additional functions preferably provided by the application software run on the personal digital assistant 420 will now be described. Returning to FIG. 15, user selection of the Input Check icon 463 on the system main menu 460 causes the display of an input check select screen 500 (as illustrated in FIG. 18) on the screen display 422. The input check select screen 500 may comprise one or more pages associated with each network node, listing all of the testable input switches, actuators, relays, or other components associated with the network node. In a preferred embodiment, a drop down menu 504 is available at the activation of a drop down menu button 502, that lists all of the available network nodes of the control network 218. Using the drop down menu 504, the user selects a particular network node (e.g., "AC-BO") to be tested. Selection of a network node from the drop down menu 504 results in one or more pages appearing on the input select display screen 500 listing all testable input components 506 associated with the selected network node. The user then indicates the input components 506 to be tested by selecting the corresponding check box(es) 508 on the page of the input check select screen 500.

In response to selection of the check boxes 508 for the desired input components 506 to be tested, the application software of the personal digital assistant 420 issues commands to the control network 218 (over the wireless communication link, via the wireless intermediary device 205) to check the status of the selected input components 506. Upon receiving a response from the control network 218, the input check function 621 of the application software highlights or otherwise identifies any malfunctioning input components 506 visually on the input check select screen 500. The operator then may replace the indicated defective input components 506, or otherwise locate the fault or cause of failure, to repair the malfunction. Remote testing of control network inputs 506 in this manner is useful to the operator because often components 506 are located in hard to access places, particularly in the context of transit vehicles, as well as in many other applications. The drop down menu 504 on the input check select screen 500 is also useful to the user as a directory to determine the names of input components 506 and network nodes of the control network 218.

Figure 19:
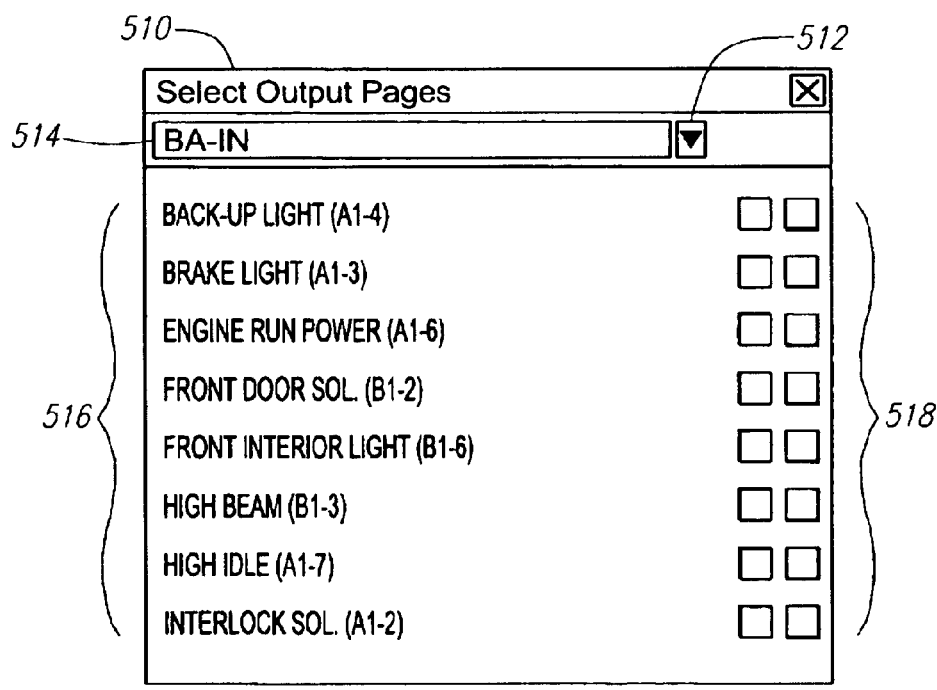
FIG. 19 is an example of an output check select screen as may be used, for example, in the computerized diagnostic device illustrated in FIG. 12.

Returning once again to FIG. 15, user selection of the Output Check icon 464 on the system main menu 460 results in a very similar sequence of events, and, initially, causes the display of an output check select screen 510 (as illustrated in FIG. 19) on the screen display 422. The output check select screen 510 may comprise one or more pages associated with each network node, listing all of the testable output switches, actuators, relays, or other components associated with the network node. In a preferred embodiment, a drop down menu 514 is available at the activation of a drop down menu button 512, that lists all of the available network nodes of the control network 218. Using the drop down menu 514, the user selects a particular network node (e.g., "BA-IN") to be tested. Selection of a network node from the drop down menu 514 results in one or more pages appearing on the input select display screen 510 listing all testable output components 516 associated with the selected network node. The user then indicates the output components 516 to be tested by selecting the corresponding check box(es) 518 from the first column of check boxes on the page of the input check select screen 510.

In response to selection of the check boxes 518 for the desired output components 516 to be tested, the application software of the personal digital assistant 420 issues commands to the control network 218 (over the wireless communication link, via the wireless intermediary device 205) to activate all necessary input components (e.g., switches) to force the selected output function. The application software of the personal digital assistant 420 then issues commands to the control network 218 (again over the wireless communication link, via the wireless intermediary device 205) to check the status of the selected output components 516. Upon receiving a response from the control network 218, the output check function 622 of the application software highlights or otherwise identifies any malfunctioning output components 516 visually on the output check select screen 510. The operator then may replace the indicated defective output components 516, or otherwise locate the fault or cause of failure, to repair the malfunction. As with the Input Check function, the Output Check function provides the benefit of remote testing, which is very convenient for operational personnel. Further, the drop down menu 514 on the output check select screen 510 is also useful to the user as a directory to determine the names of output components 506 and network nodes of the control network 218.

In the case of output state failure, the Output Check function of the application software running on the personal digital assistant 420 allows interactive real time monitoring of the output functions 516. The real time monitoring function is activated by the user selecting the appropriate check box(es) 518 in the second column on the output check select screen 510 corresponding to the failed output 516. Real time monitoring can also be selected directly from the diagnostic system main menu screen 460 shown in FIG. 15.

Figure 23:
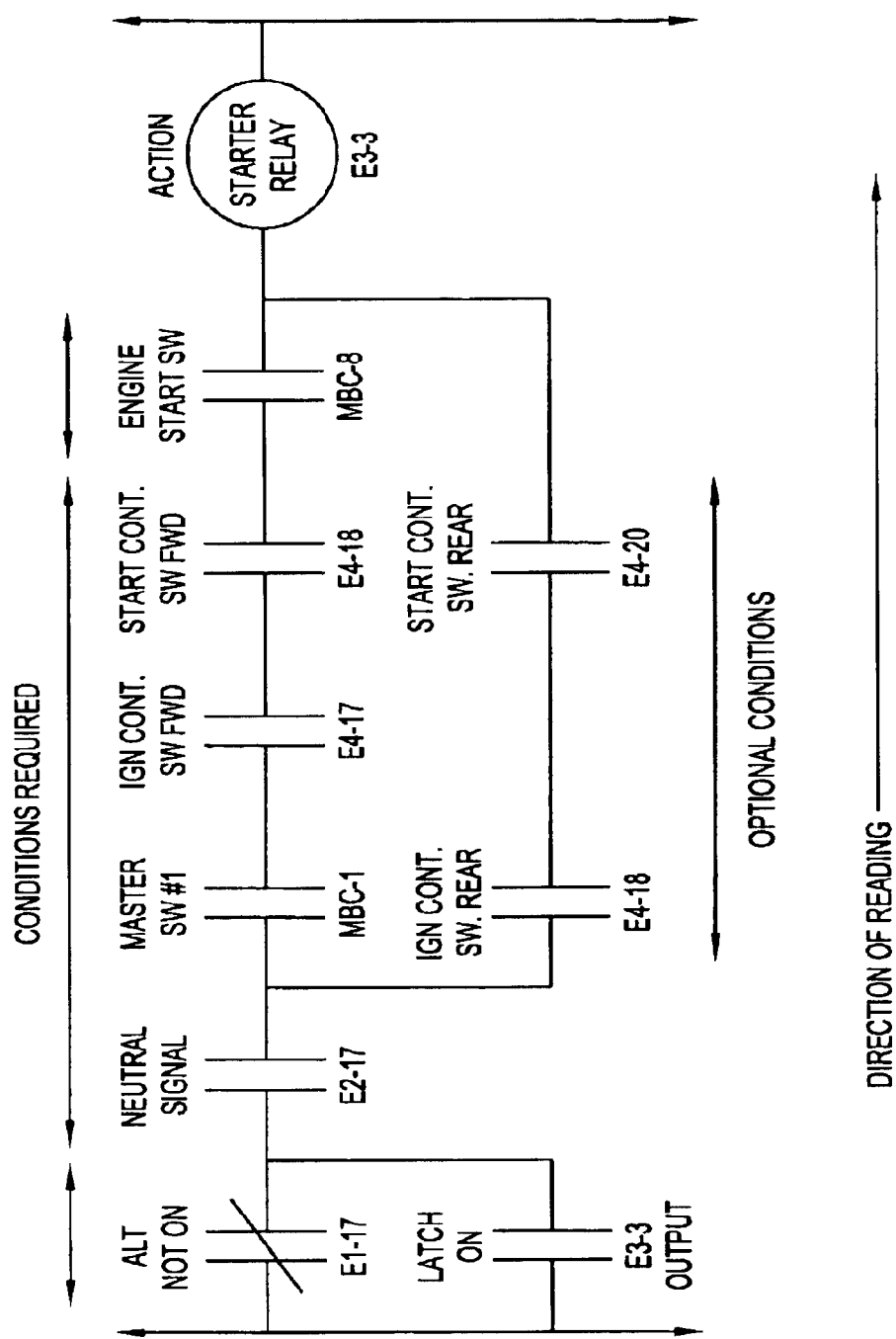
FIG. 23 is an example of a logic ladder chart.

In a preferred embodiment, the real time monitoring feature of the personal digital assistant 420 preferably provides the ability to display a graphic, visual diagram, in "logic ladder" format, of the on/off states of selected control network components. Although many different formats could be chosen, a logic ladder format is particularly useful for diagnostic and maintenance personnel. FIG. 23 is an example of a logic ladder chart, showing various conditions that are required to activate a starter relay ("E3-3"). Such conditions, in this example, include at least the following: (1) alternator is not charging; (2) vehicle is in neutral; and either (3) the master switch is on, the ignition and starter controller switches are set in front start positions, and the starter button is on; or (4) the rear ignition and starter switches are set in start position.

FIG. 14 shows a real time monitoring screen 450 displayed by the application software running on the personal digital assistant 420 in response to selection of the Real Time Monitoring function. The real time monitoring screen 450 preferably displays a set of input elements 456 (i.e., conditions) and the corresponding system output 458, in a logic ladder format. In this embodiment, the input elements 456 of the circuit are highlighted to illustrate that the element is operating properly. This function allows real time monitoring of input components and output components within the control network 218.

In a preferred embodiment, a control module drop down menu 452 is available by selecting a drop down menu button 451, providing a list of all network nodes of the control network 218. The user may thereby select a particular network node for diagnostic testing. When a network node is selected, a network node output drop down menu 453 is displayed, providing a list of all system outputs for the selected network node. The user may then scroll through the list and select a particular system output to be tested using the real time monitoring function.

In a preferred embodiment, the real time monitoring function displays a graphical diagram of the logic ladder format diagram including all input elements 456 (i.e., conditions) required to activate the selected output 458, displayed as symbols on the real time monitoring screen 450. From the logic ladder diagram, the user then may individually select each input element 456 to perform real time diagnostic testing of each input element 456. If the element is functioning properly, then its corresponding symbol on the real time monitoring screen 450 illuminates or becomes otherwise visually distinguished. If the switch is defective, it will not illuminate or becomes otherwise visually distinguished in a manner indicated that it is not operating. This function allows fast and convenient real time diagnostic monitoring of a complete circuit, from the input elements 456 to the system output 458, in all possible input combinations.

Figure 24:
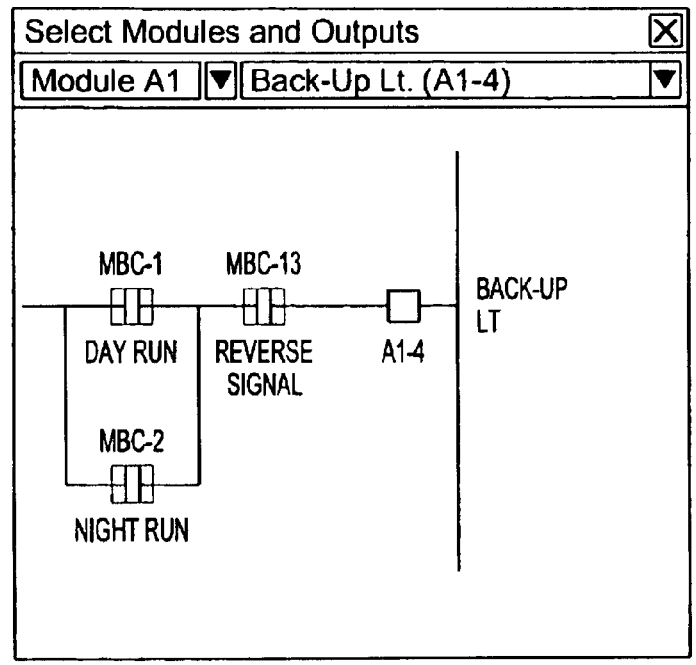
FIGS. 24, 25 and 26 are screen images illustrating activation of certain control network components depicted graphically in a logic ladder format.
Figure 25:
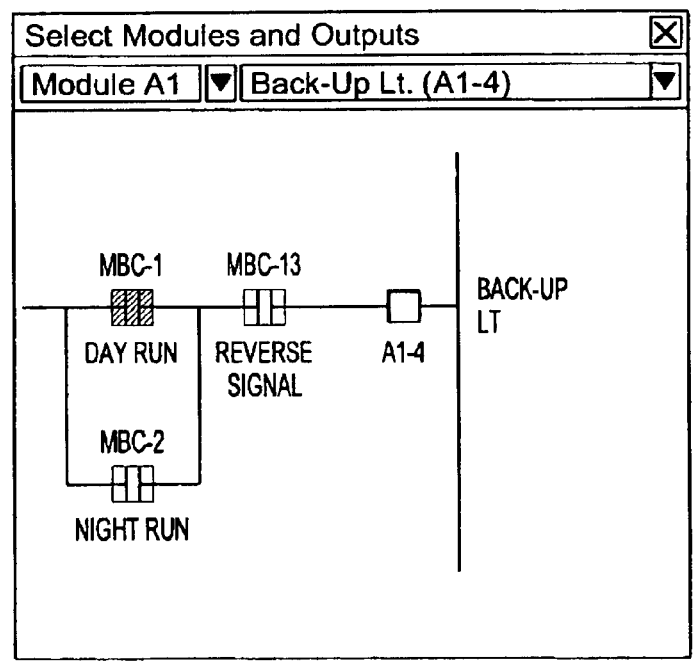
Figure 26:
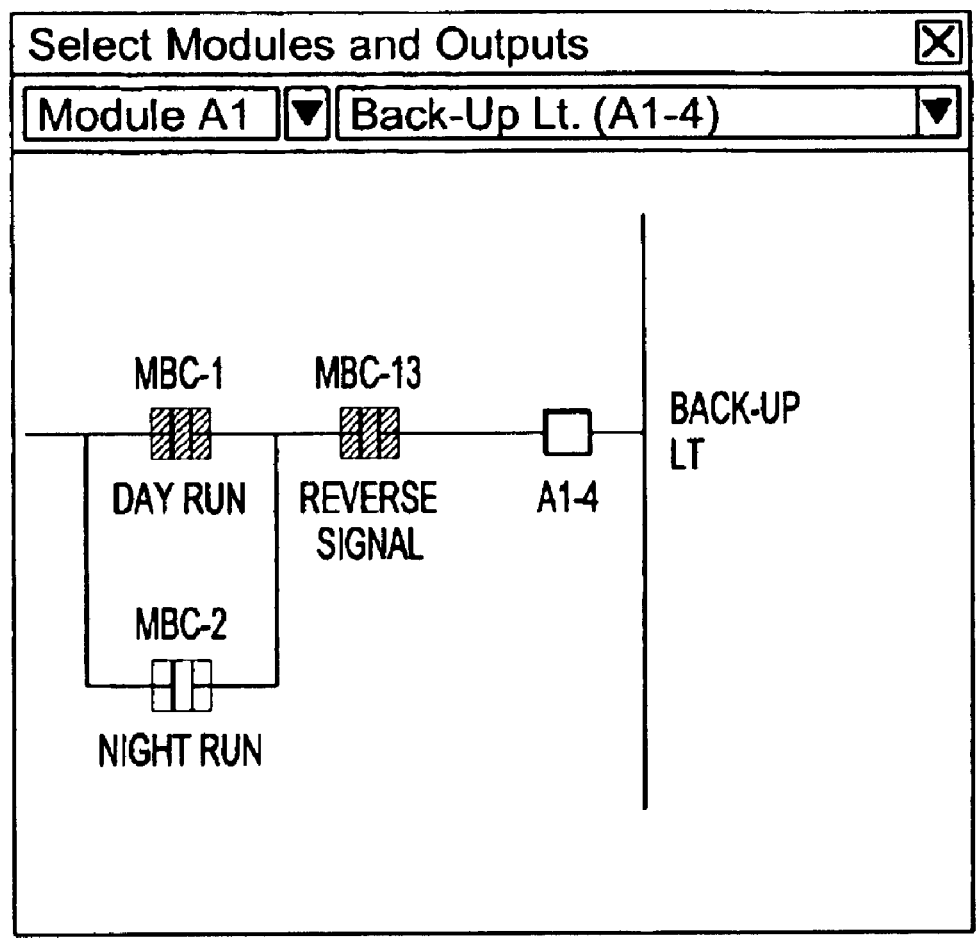

FIGS. 24, 25 and 26 show examples of screen images illustrating activation of certain input elements depicted symbolically within a logic ladder format, eventually leading to activation of an output component (i.e., back-up light). In FIG. 24, the initial logic ladder diagram is illustrated for the user on the screen display 422. The user then may select the first input element or switch ("MBC-1"), causing it to become visually distinguishable, as illustrated in FIG. 25 (in this particular example, it becomes shaded, but it can as easily be illuminated or color coded as well). Then, the user may select the second input element or switch ("MBC-13"), causing it to become visually distinguishable, as illustrated in FIG. 26. When the inputs have been so activated, the output state of the output component (i.e., backup light) can be checked.

To carry out the Real Time Monitoring function, as each input element is selected by the user, the application software sends the appropriate commands across the wireless connection (via the wireless intermediary device 205 or 430) to the control network 218, which responds by activating the appropriate switch or component. The control network 218 can send a response to the personal digital assistant 420 as each switch or component is activated, or else the application software can periodically poll the status registers at the control network to determine when the switch or component has activated or reached its desired state.

As noted, the real time monitoring select function may be invoked for a particular system output by selecting the check box 518 (in the second column) for the output 458 on the output check select screen 510, shown in FIG. 19. In response to selection of one or more real time monitoring options using the check boxes 518, the application software automatically displays the real time monitoring select screen 450 on the screen display 422 of the personal digital assistant 420, with the corresponding logic ladder diagram (i.e., switch hierarchy) for the selected system output 458. When multiple system outputs 458 are selected, the application software may rotate through the corresponding logic ladder diagrams sequentially, or may allow the user to scroll through them until the desired screen is found. Allowing direct access from the Output Check function to the Real Time Monitoring function eliminates the need for a user to select the network node and system output 453 each time on the Real Time Monitoring select screen 450, thereby increasing the efficiency of testing multiple system outputs 458 and their corresponding input elements 456.

Figure 20:
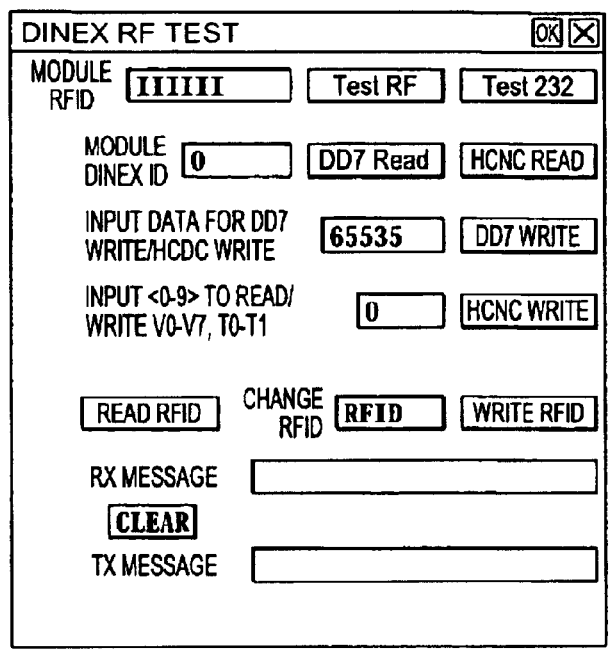
FIG. 20 is an example of an RF test screen as may be used, for example, in the computerized diagnostic device illustrated in FIG. 12.

Returning once again to FIG. 15, user selection of the RF Test icon 472 (or communication link test icon) on the diagnostic system main menu 460 displays an RF test screen on the personal digital assistant 420. An example of a preferred RF test screen 520 is shown in FIG. 20. The RF test screen 520 preferably activates an RF test function, which verifies the integrity of the connection both between the personal digital assistant 420 and the wireless intermediary unit 430, and the connection between the wireless intermediary unit 430 and the control network 218. A simple checksum or other error detection technique may be used. Any errors detected in these communication links cause the RF test function 615 of the application software to generate an error message on the RF test screen 520 of the personal digital assistant 420, thereby alerting the user of a potential problem.

Figure 21:
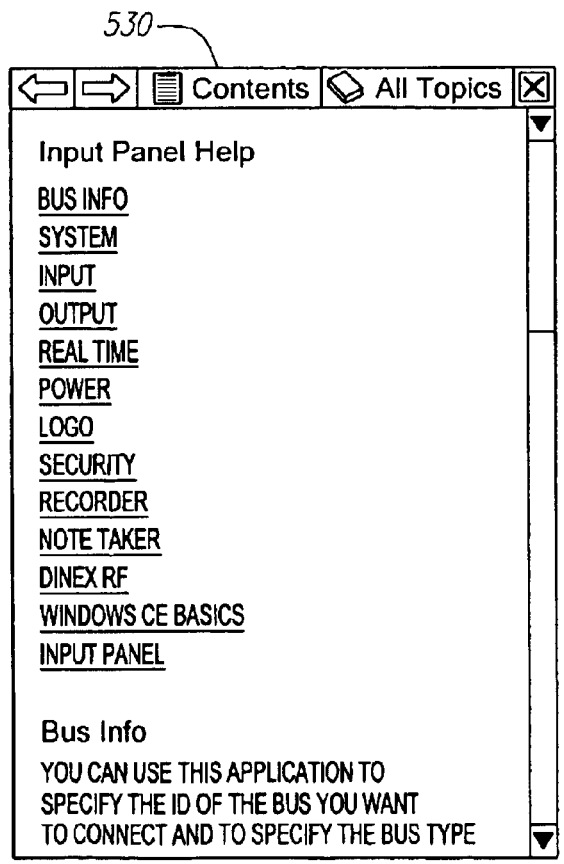
FIG. 21 is an example of a system help screen as may be used, for example, in the computerized diagnostic device illustrated in FIG. 12.

Various miscellaneous features are also preferably provided in connection with the test and diagnostic features. For example, returning again to FIG. 15, user selection of a Power icon 467 on the diagnostic system main menu 460 may act to shut down the power to the personal digital assistant 420. User selection of a Help icon 466 on the diagnostic system main menu 460 displays a system help screen 530 on the screen display 422 of the personal digital assistant 420, an example of which is illustrated in FIG. 21. The help screen 530 provides on-line help for the various functions provided by the test and diagnosis application software running on the personal digital assistant 420. A scroll-down menu of help topics may be provided, from which the user may make a selection in order to get further information on the topic.

The personal digital assistant 420 may be employed within a wireless diagnostic and control system 700 such as illustrated in FIG. 27. In such an arrangement, the portable electronic diagnostic equipment 730 illustrated in FIG. 27 may be embodied as the personal digital assistant 420 along with a wireless intermediary unit 430. Tracking of the location and/or movement of the portable electronic diagnostic equipment 730, as previously described in connection with FIG. 27, enables certain functions useful to the operator to be performed during the diagnosis and maintenance of control network facilities. For example, one feature of a preferred personal digital assistant 420 that has been previously described is the ability to view various aspects of the control network 705 graphically on the unit's screen display 422, where the image of the control network facility (in this example, vehicle 702) is presented in a faint outline or phantom format, while the control network 705 within the vehicle 702 appears superimposed on the phantom image in solid, dark lines, thereby allowing the operator to easily distinguish the facility (i.e., vehicle 702) from the components of the control network 705 being observed or tested. FIG. 13 illustrates an example of a phantom image of a control network facility 440 (in this case a bus, corresponding to vehicle 702 shown in FIG. 27) with superimposed control network nodes 442 (corresponding to network nodes 740 of control network 705 on-board the vehicle 702 shown in FIG. 27).

Through use of the wireless communication links previously described in connection with the wireless diagnostic and control system 700 of FIG. 27, the position of the portable electronic diagnostic equipment 730 (in this example, personal digital assistant 420 and wireless intermediary device 430) relative to the vehicle 702 being serviced. Such a determination may be made based in part on network configuration information stored in the local area network 754. The relevant position information may then be used by the local area network 754 and/or personal digital assistant 420 to select from a plurality of available graphical displays showing the control network facility (i.e., vehicle 702) from different positional perspectives. The local area network 754 either then transmits the selected graphical display data back to the personal digital assistant 420, or else transmits the relevant positional information to the personal digital assistant 420 to allow it to select the appropriate graphical display data, for presentation on the diagnostic unit's screen display 422.

Such functionality allows the operator of the personal digital assistant 420 to view the control network 702 on the portable diagnostic unit screen display 422 from different positional perspectives, depending upon the position of the operator relative to the control network facility 702. For example, if the operator stands behind vehicle 702 and activates the previously-described system check function 620, the local area network 754 is able to determine the position of the operator relative to the vehicle 702 based on the microcell 762 handling the communication link, along with other information as may be available (e.g., manually entered viewpoint information from the operator). The resulting graphical display of the vehicle 702 would then be selected in an orientation with a view from the rear of the vehicle 702, since the operator is standing behind the vehicle 702. If the operator moves to the front of the vehicle 702, the system is able to track the movement of the operator and to select and transmit a different graphical display of the vehicle 702 oriented in a different position—i.e., from the front of the vehicle 702—or else to transmit positional information allowing the personal digital assistant 420 to retrieve a new image or rotate the graphical display image of the vehicle 702 so as to be properly oriented with respect to the operator's new position.

The personal digital assistant 420 may, in certain embodiments, also be provided with a zoom display function, whereby the operator may increase or decrease the size of the graphical image on the screen display 422 of the personal digital assistant 420, to bring certain aspects of the image into greater focus.

The variable-orientation (and zoom) graphical display capability of the portable electronic diagnostic equipment 730 should assist the operator in more easily identifying and analyzing particular network nodes 740 of the control network 705, by providing particular focus on the network nodes 740 in closest proximity to the operator's position. It also may help the operator in assessing problems with the control network 705 or locating particular network nodes 740, because the image is displayed from the same perspective of the operator. Otherwise, particularly with large control networks 705 (such as may be contained in an airplane, ship or building), a single fixed display orientation of the control network 705 could prove visually confusing to the operator, especially for nodes that are on the opposite side of the vehicle 702 or control network facility. By providing a variety of different perspective views of the control network 705 and vehicle 702, and displaying a selected perspective view according in part to the position of the operator, it is more likely that the operator will achieve a direct, unobstructed view of a target area of the control network 705 for analysis, facilitating the diagnosis and testing of the various components of the control network 705 (including components controlled by the control network 705).

In certain embodiments as described herein, remote monitoring and control of the portable electronic diagnostic equipment 730 is carried out with the assistance of the local area network 754, as illustrated in FIG. 27. Ground stations 710 arranged in the wireless diagnostic and control system 700 may, in such embodiments, be used to monitor and control the operation of portable electronic diagnostic equipment 730 within the maintenance area.

Various applications programs may be executed on one or more user terminals 781 (or other computers) to provide end-user monitoring and control functionality. As examples, the local area network 754 may monitor and record each diagnostic or test transaction between the portable electronic diagnostic equipment 730 (in this example, personal digital assistant 420) and the control network 705. Each diagnostic or test operation, when transmitted by the portable electronic diagnostic equipment 730 or the wireless interface 720 of the control network 705, is intercepted by one or more of the ground stations 710 and relayed over to the local area network 754, where it may be recorded in the diagnostic and maintenance information database 780. Each such transaction may also be observed on one of the user terminals 781. Other operator interactions may also be recorded and separately transmitted to the local area network 754. For example, when an incorrect user identification or password is entered, the personal digital assistant 420 may transmit this fact to the local area network 754.

Where multiple portable electronic diagnostic devices 730 are being used in the same proximity, and where multiple control networks 705 and/or vehicles 702 are being serviced in the same proximity, it will generally be necessary to distinguish among communications from potentially many different sources. One way to do so is to assign a separate communication channel to each diagnostic and maintenance session. In other words, a separate frequency, time slot and/or code (from a set of possible frequency bands, time slots and/or codes) may be assigned to the portable electronic diagnostic equipment 730 and the control network 705 at the start of a diagnostic and maintenance session. Such an assignment may be made by way of a separate control channel, for example. Thereafter, all communications for the particular session will be carried out over the particular channel. The local area network 754 instructs the ground stations 710 only to monitor assigned channels, and can differentiate transmission sources based upon the channel being used. As for distinguishing between the portable electronic diagnostic equipment 730 and the control network 705, source identification information may be provided in message headers so as to enable the local area network 754 to identify the communication source. Such source identification information may be permanently assigned or built-in to each communication device, or else may be temporarily assigned by the local area network 754 each time a new communication device becomes operative in the maintenance area.

The local area network 754 thereby enables a "supervisor" (or even an automated monitoring program) to perform various administrative, security, and quality control functions and operations. The local area network 754 preferably monitors all portable electronic diagnostic devices 730 in the maintenance area, and may keep track of, for example, the identification of each portable electronic diagnostic device 730 and its associated operator (based on, e.g., log-in information), the control network 705 currently being serviced by each operator, each diagnostic or test transaction performed by each operator and the results thereof, the sequence of diagnostic and test transactions performed by each operator, the starting and ending times and duration of each diagnostic and maintenance session, and any other information useful for administrative, security or quality control functions and operations.

The information obtained from monitoring various portable electronic diagnostic equipment in the wireless diagnostic and control system 700 is preferably displayed to the supervisor at the local area network 754 in real time on the display at one or more user terminals 781, thereby allowing monitoring of diagnostic and maintenance operations as they are being performed. If the supervisor decides it is necessary to terminate access to a control network 705 by a particular operator (for example, to prevent an illegal or inappropriate command), the supervisor may enter an instruction at the user terminal 781 to do so. In response to such an instruction, a command is issued from one or more ground stations 710 to the control network 705 and/or the portable electronic diagnostic equipment 730, causing the portable electronic diagnostic equipment 730 or control network 705 to take appropriate action to prevent further use by the operator. For example, either the portable electronic diagnostic equipment 730 and/or the control network 705 may terminate the diagnostic and test session and, if desired, lock out the particular operator.

The tracking information obtained at the local area network 754 from monitoring diagnostic and maintenance activity may be stored in a log file for further processing or review. Reports can be produced from the log files for quality control and work efficiency analysis. For example, based on the information stored in the log files, a worker productivity report can be generated for each diagnostic technician, detailing information about the control networks 705 serviced, length of time required for each diagnostic session, and test and diagnostic functions carried out during each diagnostic session.

In certain embodiments as disclosed herein, diagnostic and test functions similar to those carried out using the portable electronic diagnostic equipment 730 are carried out remotely by technical personnel stationed at the user terminals 754. For example, most any of the diagnostic and test functions described with respect to the personal digital assistant 420 shown in FIG. 12 can be performed using a display and user interface at the user terminal 781, as opposed to the screen display 422 and user interface of the personal digital assistant 420. The wireless capability of the ground stations 710 provides the technical personnel at the local area network 754 with wireless capability similar to the wireless intermediary unit 430 connected to the personal digital assistant 420. When used in conjunction with the portable electronic diagnostic equipment 730, the advantages of the wireless diagnostic and control system 700 are extended further, by allowing user terminals 781 of the local area network 754 to substitute, from a functional standpoint, for the portable electronic diagnostic equipment 730. If all of the portable electronic diagnostic devices 730 happen to be in use or some become damaged or otherwise inoperable, a technician can still perform remote diagnostic analysis on control networks 705 at a user terminal 781 of the local area network 754, thereby causing no delays in maintenance and repair of control network facilities. Further, the advantages of allowing remote diagnosis and test in harsh environments, without requiring human presence directly at the control network 705, are readily apparent.

It is thus apparent that a wide variety of highly versatile and flexible system embodiments have been provided for remote monitoring, control and/or locating of portable electronic diagnostic devices connected to a cellular LAN performing remote diagnostic analysis of control networks.

While preferred embodiments of the invention have been described herein, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. A system for facilitating diagnosis and maintenance of electronic control networks, comprising:

a wireless diagnostic device, said wireless diagnostic device comprising a transmitter and receiver for communicating over a wireless communication channel with a control network via a control network wireless interface;

a plurality of wireless ground stations dispersed over an area, each of said wireless ground stations comprising a ground station receiver configured to monitor messages transmitted over said wireless communication channel between said wireless diagnostic device and the control network, said wireless ground stations are arranged so as to form a plurality of microcells; and a processor for comparing received signal strengths at said wireless ground stations and determining a location of said wireless diagnostic device thereby;

wherein said wireless diagnostic device comprises a screen display for displaying graphical images depicting the control network;

wherein each of said wireless ground stations further comprises a ground station transmitter, whereby communication between said wireless ground stations and said wireless diagnostic device may be carried out;

wherein the location of said wireless diagnostic device is determined at least in part by determining which microcell said wireless diagnostic device is located in, based upon the received signal strengths at said wireless ground stations; and wherein particular graphical images depicting the control network are selected for display on said wireless diagnostic device based upon the location of said wireless diagnostic device.

2. The system of claim 1, further comprising a ground station interface connected to said wireless ground stations.

3. The system of claim 2, wherein said processor is located at said ground station interface.

4. The system of claim 2, further comprising a local area computer network connected to said ground station interface.

5. The system of claim 4, wherein said local area computer network comprises a memory storage device for storing transmitted messages monitored by said wireless ground stations over said wireless communication channel.

6. The system of claim 1, wherein one or more of said wireless ground stations periodically transmits location information to said wireless diagnostic device.

7. The system of claim 1, wherein selection of the particular graphical images for display is carried out at said wireless diagnostic device.

8. The system of claim 1, wherein selection of the particular graphical images for display is carried out at a remote computer network connected to said wireless ground stations, said remote computer network storing said graphical images in a database.

9. The system of claim 1, wherein selection of the particular graphical images is based in part upon an orientation of an operator of the wireless diagnostic device with respect to the control network.

10. The system of claim 9, wherein said wireless diagnostic device comprises means for inputting information relating to the operator's orientation with respect to the control network.

11. The system of claim 1, wherein said wireless diagnostic device comprises a graphical display device connected to a wireless intermediary unit, said wireless intermediary unit containing said transmitter and receiver for communicating over said wireless communication channel with said control network.

12. A method for facilitating diagnosis and maintenance of electronic control networks, said method comprising the steps of:

communicating over a wireless communication channel between a wireless diagnostic device and a control network via a control network wireless interface;

monitoring, at a plurality of wireless ground stations, messages transmitted over said wireless communication channel between said wireless diagnostic device and the control network over said wireless communication channel, said wireless ground stations are arranged in a plurality of microcells;

comparing received signal strengths at said wireless ground stations, and determining a location of said wireless diagnostic device thereby, said determining step comprising the step of determining which microcell said wireless diagnostic device is located in, based upon the received signal strengths at said wireless ground stations;

periodically transmitting location information from said wireless ground stations to said wireless diagnostic device; and selecting particular graphical images depicting the control network for display on said wireless diagnostic device based upon the location of said wireless diagnostic device.

13. The method of claim 12, wherein said step of comparing received signal strengths at said wireless ground stations is performed by a processor at a ground station interface connected to said wireless receiving stations.

14. The method of claim 13, further comprising the step of storing transmitted messages monitored by said wireless ground stations over said wireless communication channel on a memory storage device connected to said ground station interface.

15. The method of claim 12, wherein selection of the particular graphical images for display is carried out at said wireless diagnostic device.

16. The method of claim 12, wherein selection of the particular graphical images for display is carried out at a remote computer network connected to said wireless ground stations, said remote computer network storing said graphical images in a database.

17. The method of claim 12, wherein selection of the particular graphical images is based in part upon an orientation of an operator of the wireless diagnostic device with respect to the control network.

18. The method of claim 17, further comprising the step of inputting information relating to the operator's orientation with respect to the control network into said wireless diagnostic device.

19. A system for facilitating diagnosis and maintenance of electronic control networks, comprising:

a plurality of wireless diagnostic devices, each of said wireless diagnostic devices comprising a transmitter and receiver for communicating with one or more control networks over a plurality of wireless communication channels; and a plurality of wireless ground stations dispersed over an area, each of said wireless ground stations comprising a ground station receiver configured to monitor messages transmitted over said wireless communication channels between said wireless diagnostic devices and the one or more control networks; and a processor for comparing received signal, strengths at said wireless ground stations and determining a location of each of said wireless diagnostic devices thereby;

wherein each of said wireless diagnostic devices comprises a screen display for displaying graphical images depicting the one or more control networks; and wherein particular graphical images for display are selected in part based upon the location of the wireless diagnostic device.

20. A system for facilitating diagnosis and maintenance of electronic control networks, comprising:

a wireless diagnostic device, said wireless diagnostic device comprising a transmitter and receiver for communicating wirelessly with a control network via a control network wireless interface, and further comprising a screen display;

a plurality of wireless ground stations dispersed over an area for monitoring messages transmitted between said wireless diagnostic device and the control network, said ground stations receiving information by which a determination of a location of said wireless diagnostic device is made;

wherein graphical images depicting the control network are displayed on said wireless diagnostic device based upon the location of said wireless diagnostic device.

21. The system of claim 20, further comprising a ground station interface connected to said wireless ground stations, and a processor located at said ground station interface and configured to determine the location of said wireless diagnostic device.

22. The system of claim 20, further comprising a local area computer network connected to said ground station interface, said local area computer network comprises a memory storage device for storing transmitted messages monitored by said wireless ground stations.

23. The system of claim 20, wherein one or more of said wireless ground stations periodically transmits location information to said wireless diagnostic device.

24. The system of claim 20, wherein selection of the particular graphical images for display is carried out at said wireless diagnostic device.

25. The system of claim 20, wherein selection of the particular graphical images for display is carried out at a remote computer network connected to said wireless ground stations, said remote computer network storing said graphical images in a database.

26. The system of claim 20, wherein selection of the particular graphical images is based in part upon an orientation of an operator of the wireless diagnostic device with respect to the control network.

27. The system of claim 26, wherein said wireless diagnostic device comprises means for inputting information relating to the operator's orientation with respect to the control network.

* * * * *